(12) United States Patent
Fujimaki et al.

(10) Patent No.: US 10,948,724 B2
(45) Date of Patent: Mar. 16, 2021

(54) TRANSMISSIVE DISPLAY DEVICE, DISPLAY CONTROL METHOD, AND COMPUTER PROGRAM

(71) Applicant: SEIKO EPSON CORPORATION, Tokyo (JP)

(72) Inventors: Yutaka Fujimaki, Matsumoto (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/224,855

(22) Filed: Dec. 19, 2018

(65) Prior Publication Data

US 2019/0187477 A1 Jun. 20, 2019

(30) Foreign Application Priority Data

Dec. 20, 2017 (JP) .............................. JP2017-244064

(51) Int. Cl.
*G02B 27/01* (2006.01)
*G06T 19/00* (2011.01)
*G08B 21/02* (2006.01)
*G06F 1/16* (2006.01)

(52) U.S. Cl.
CPC ........ *G02B 27/0172* (2013.01); *G06T 19/006* (2013.01); *G08B 21/02* (2013.01); *G02B 2027/014* (2013.01); *G02B 2027/0134* (2013.01); *G02B 2027/0138* (2013.01); *G02B 2027/0141* (2013.01); *G02B 2027/0178* (2013.01); *G06F 1/163* (2013.01)

(58) Field of Classification Search
None
See application file for complete search history.

(56) References Cited

U.S. PATENT DOCUMENTS

| 2011/0128139 | A1* | 6/2011 | Tauchi | ................... | B60Q 9/008 |
|||||| 340/439 |
| 2014/0019005 | A1* | 1/2014 | Lee | ........................ | G08G 1/166 |
|||||| 701/36 |
| 2014/0240484 | A1 | 8/2014 | Kodama et al. | | |
| 2014/0368601 | A1* | 12/2014 | decharms | ............... | H04W 4/021 |
|||||| 348/14.02 |
| 2016/0138930 | A1* | 5/2016 | Akiyama | ........... | G01C 21/3461 |
|||||| 701/465 |
| 2016/0288318 | A1 | 10/2016 | Nakazato | | |
| 2016/0314623 | A1* | 10/2016 | Coleman | .............. | G02B 27/017 |
| 2017/0160392 | A1* | 6/2017 | Brisimitzakis | .......... | G01S 7/062 |

FOREIGN PATENT DOCUMENTS

JP 2014-164482 A 9/2014
JP 2016-197393 A 11/2016

* cited by examiner

*Primary Examiner* — YuJang Tswei
(74) *Attorney, Agent, or Firm* — Oliff PLC

(57) ABSTRACT

A transmissive display device includes an image display unit configured to transmit an outside scenery and display an image viewable with the outside scenery, an interference risk region calculation unit configured to calculate an interference risk region where there is a risk of interference between a user of the transmissive display device and a mobile body, a risk level determination unit configured to determine a risk level of the interference, based on a relative positional relationship between the user and the mobile body, and a display control unit configured to display, on the image display unit, an image indicating the interference risk region in a display mode according to the determined risk level.

13 Claims, 15 Drawing Sheets

TRANSMISSIVE DISPLAY DEVICE, DISPLAY CONTROL METHOD, AND COMPUTER PROGRAM

BACKGROUND

1. Technical Field

The invention relates to a transmissive display device.

2. Related Art

In recent years, products are automatically assembled with industrial robots, such as two-arm robots, which control a plurality of arms in cooperation. The operation contents of the industrial robots are taught (programmed) to the industrial robots in advance such that an assembling operation of products can be performed while avoiding collision between the arms of the robot, and between an arm and objects or the like in the working area. Typically, when teaching an operation content to a robot, timing is adjusted to avoid collision between the arms while confirming locations where the arms interfere with each other by simulating the operation content of the robot (hereinafter, referred to as "interference confirmation"). JP-A-2016-197393 proposes a technique of improving working efficiency in interference confirmation performed by a worker wearing a transmissive head mounted display device, by displaying a CG image of an operation state of an arm of a second robot overlapping on an actual operation state of an arm of a first robot. JP-A-2014-164482 discloses a technique in which, in a maintenance work of a substrate processing device performed by a worker wearing a transmissive head mounted display device, information required by the worker such as information relating to components, the maintenance manual, and/or information required to be notified to the worker is displayed on the head mounted display device.

Actually, however, there is no sufficient measure regarding a technique of avoiding collision between a robot and a worker in a case where the worker enters a working area of the robot and works with the robot at the same time in the same area. For example, in the technique disclosed in JP-A-2016-197393, an operation content is taught to a robot in advance, and consequently, in a situation different from a situation assumed by the taught content, such as a situation in which a worker mistakenly enters a movable region of the robot, collision between the robot and the worker may occur. Such a problem may occur not only in industrial robots, but also in any devices, such as vehicles, which can be automatically operated. For example, in a case where a driver of a vehicle drives the vehicle while confirming a display content of a head-up display mounted on the vehicle, collision between the vehicle and another vehicle may be caused. In view of this, there is a demand for a technique of reducing collision between a user who operates a device according to a content displayed on a transmissive display device or the device and other devices.

SUMMARY

The invention has been made to address at least some of the above-described issues, and can be realized as the following embodiments.

(1) An exemplary embodiment of the invention provides a transmissive display device. The transmissive display device includes an image display unit configured to transmit an outside scenery and display an image viewable with the outside scenery, an interference risk region calculation unit configured to calculate an interference risk region where there is a risk of interference between a user of the transmissive display device and a mobile body, a risk level determination unit configured to determine a risk level of the interference, based on a relative positional relationship between the user and the mobile body, and a display control unit configured to display, on the image display unit, an image indicating the interference risk region in a display mode according to the determined risk level.

According to the transmissive display device of this aspect, the interference risk region, which is the region where there is a risk of interference between the user of the transmissive display device and the mobile body, is calculated, the risk level of the interference is determined based on the relative positional relationship between the user and the mobile body, and the calculated image indicating the interference risk region is displayed on the image display unit in a display mode according to the determined risk level, and therefore the user can easily recognize the interference risk region and the risk level, thus possibly preventing collision between the user and the mobile body.

(2) In the transmissive display device according to the above-described aspect, the transmissive display device may further include a notification unit, and, in a case where it is determined that the risk level becomes a predetermined risk level within a predetermined time period after the image indicating the interference risk region is displayed on the image display unit, the notification unit may provide a notification relating to the risk level to the user. According to the transmissive display device of this aspect, in a case where it is determined that the risk level becomes a predetermined risk level within a predetermined time period after the image indicating the interference risk region is displayed, a notification relating to the risk level is provided to the user, and therefore the user can easily recognize a situation in which the risk of interference between the user and mobile body is high.

(3) In the transmissive display device according to the above-described aspect, the notification unit may control the display control unit to display a notification on the image display unit in a display mode according to the determined risk level. According to the transmissive display device of this aspect, a notification is displayed on the image display unit in a display mode according to the determined risk level, and therefore the user can easily recognize the risk level, thus improving the convenience of the user.

(4) In the transmissive display device according to the above-described aspect, the notification unit may provide the notification with sound. According to the transmissive display device of this aspect, a notification is provided with sound, and therefore the convenience of the user can be improved.

(5) In the transmissive display device according to the above-described aspect, the display control unit may cause information, relating to an object which possibly interferes with the user in the interference risk region, to be displayed. According to the transmissive display device of this aspect, information relating to an object which may interfere with the user in the interference risk region is displayed, and therefore the user can easily recognize an object which possibly interferes with the mobile body and with the user, thus improving the convenience of the user.

(6) In the transmissive display device according to the above-described aspect, the interference risk region calculation unit may calculate the interference risk region, based on planned trajectory information indicating a planned trajectory of the mobile body. According to the transmissive display device of this aspect, the interference risk region is calculated based on planned trajectory information indicating the planned trajectory of the mobile body, and therefore the interference risk region can be accurately calculated.

(7) In the transmissive display device according to the above-described aspect, the transmissive display device may further include a sensor configured to detect variation of a position of the transmissive display device, and the risk level determination unit may determine the risk level by using at least one of a detection result of the sensor and planned trajectory information indicating a planned trajectory of the mobile body. According to the transmissive display device of this aspect, the risk level is determined by using at least one of a detection result of the sensor which detects the variation of the position of the transmissive display device and the planned trajectory information indicating the planned trajectory of the mobile body, and therefore the risk level can be precisely determined.

(8) In the transmissive display device according to the above-described aspect, the display control unit may cause the image indicating the interference risk region to be displayed with a predetermined transparent color. According to the transmissive display device of this aspect, the image indicating the interference risk region is displayed with a predetermined transparent color, and therefore blocking of the user's field of view by the displayed image indicating the interference risk region can be suppressed.

(9) In the transmissive display device according to the above-described aspect, the image display unit may include a user interface for setting the transparent color. According to the transmissive display device of this aspect, the user interface for setting the transparent color is provided, and therefore the transparent color can be set in the transmissive display device, thus improving the convenience of the user.

(10) In the transmissive display device according to the above-described aspect, the transmissive display device may further include a communication unit, and a planned trajectory information acquisition unit configured to acquire the planned trajectory information indicating the planned trajectory of the mobile body through communication using the communication unit. According to the transmissive display device of this aspect, the planned trajectory information is acquired through communication using the communication unit, and therefore the hardware resource can be reduced in comparison with a configuration in which the planned trajectory information is stored in a storage unit in advance.

(11) In the transmissive display device according to the above-described aspect, the transmissive display device may further include an imaging unit configured to image the outside scenery, and the display control unit causes the image indicating the interference risk region to be displayed overlapping with an image obtained by imaging. According to the transmissive display device of this aspect, the image indicating the interference risk region is displayed overlapping with the image obtained by imaging, and therefore the interference risk region can be easily recognized.

Various embodiments of the invention may be implemented. For example, the aspect of the invention may be implemented as a display control method of a transmissive display device, a computer program for performing the display control method, a recording medium in which the computer program is recorded and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Exemplary Embodiment

A1. Overall Configuration of Transmission-Type Display Device

Figure 1:
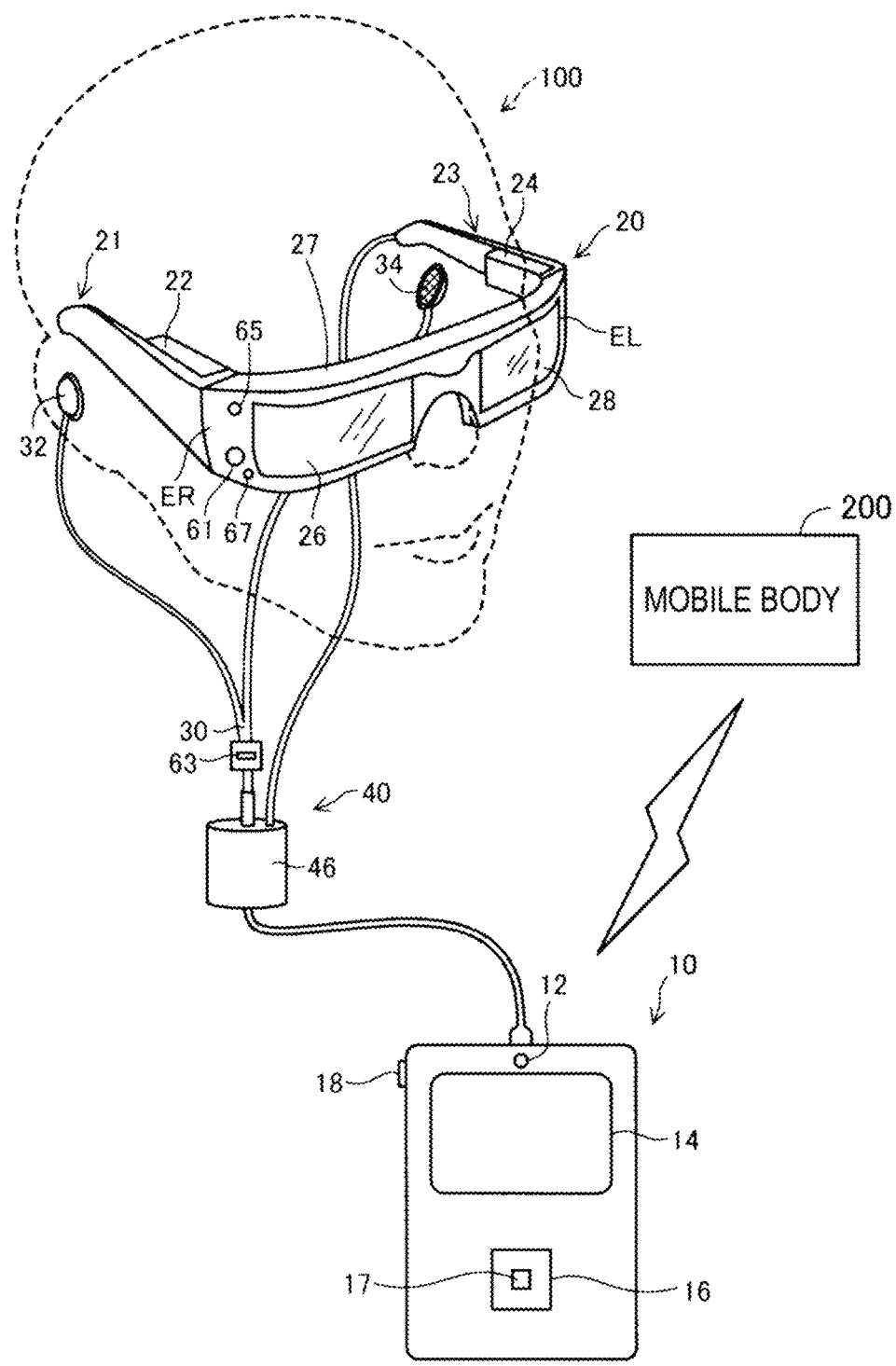
FIG. 1 is an explanatory diagram illustrating a schematic configuration of a head mounted display device according to an exemplary embodiment of the invention.

FIG. 1 is an explanatory diagram illustrating a schematic configuration of a head mounted display device 100 according to an exemplary embodiment of the invention. The head mounted display device 100 is a display device to be mounted on a user's head and is also referred to as a Head Mounted Display (HMD). The HMD 100 is a see-through type (transmission-type) head mounted display device that provides an image appearing in an external scene viewed through glasses.

In the present exemplary embodiment, a user of the HMD 100 wearing the HMD 100 on the head can operate a mobile body 200 while confirming a display content of the HMD 100. The "mobile body" is not limited to a body which moves in its entirety, but means a broader concept including a body which operates with positional change of at least a part of the body. For example, the mobile body is a robot or a vehicle, and includes a device that can operate under remote control such as a drone. In the present exemplary embodiment, the mobile body 200 is an industrial robot. FIG. 1 also illustrates the mobile body 200 with the HMD 100. The HMD 100 and the mobile body 200 are wirelessly connected with each other.

The HMD 100 includes an image display unit 20 configured to allow the user to view images and a control device (controller) 10 configured to control the image display unit 20.

The image display unit 20 is a head-mounted body to be mounted on the user's head and is shaped like eyeglasses in the exemplary embodiment. The image display unit 20 includes a support body including a right holding portion 21, a left holding portion 23, and a front frame 27 and further includes, on the support body, a right display unit 22, a left display unit 24, a right light-guiding plate 26, and a left light-guiding plate 28.

The right holding portion 21 and the left holding portion 23 respectively extend rearward from ends of the front frame 27 to hold the image display unit 20 on the user's head in a manner similar to the temples of a pair of eyeglasses. Here, when a user wears the image display unit 20, an end ER refers to one of the ends of the front frame 27 that lies on the right side of the user, while an end EL refers to the other end that lies on the left side of the user. The right holding portion 21 is provided to extend from the end ER of the front frame 27 to a position corresponding to the right temple of the user when the user wears the image display unit 20. The left holding portion 23 is provided to extend from the end EL of the front frame 27 to a position corresponding to the left temple of the user when the user wears the image display unit 20.

The right light-guiding plate 26 and the left light-guiding plate 28 are provided in the front frame 27. The right light-guiding plate 26 is positioned in front of the right eye of the user, when the user wears the image display unit 20, to allow the right eye to view an image. The left light-guiding plate 28 is positioned in front of the left eye of the user, when the user wears the image display unit 20, to allow the left eye to view an image.

The front frame 27 is shaped to connect one end of the right light-guiding plate 26 and one end of the left light-guiding plate 28 with each other. The position of connection corresponds to a position between eyebrows of the user when the user wears the image display unit 20. The front frame 27 may include a nose pad portion that is provided at the position of connection between the right light-guiding plate 26 and the left light-guiding plate 28, and that is in contact with the nose of the user when the user wears the image display unit 20. In this case, the nose pad portion, the right holding portion 21, and the left holding portion 23 allow the image display unit 20 to be held on the head of the user. A belt may also be attached to the right holding portion 21 and the left holding portion 23 that fits to the back of the head of the user when the user wears the image display unit 20. In this case, the belt allows the image display unit 20 to be firmly held on the head of the user.

The right display unit 22 is configured to display images on the right light-guiding plate 26. The right display unit 22 is provided on the right holding portion 21 and lies adjacent to the right temple of the user when the user wears the image display unit 20. The left display unit 24 is configured to display images on the left light-guiding plate 28. The left display unit 24 is provided on the left holding portion 23 and lies adjacent to the left temple of the user when the user wears the image display unit 20.

The right light-guiding plate 26 and the left light-guiding plate 28 according to the exemplary embodiment are optical parts (e.g., prisms) formed of a light transmission-type resin or the like, and are configured to guide image light output by the right display unit 22 and the left display unit 24 to the eyes of the user. Surfaces of the right light-guiding plate 26 and the left light-guiding plate 28 may be provided with dimmer plates. The dimmer plates are thin-plate optical elements having a different transmittance for a different wavelength range of light, and function as so-called wavelength filters. The dimmer plates are arranged to cover a surface of the front frame 27 (a surface opposite to a surface facing the eyes of the user), for example. Appropriate selection of optical property of the dimmer plates allows the transmittance of light to a desired wavelength range, such as visible light, infrared light, and ultraviolet light to be adjusted, and allows the amount of outside light entering the right light-guiding plate 26 and the left light-guiding plate 28 and passing through the right light-guiding plate 26 and the left light-guiding plate 28 to be adjusted.

The image display unit 20 guides image light generated by the right display unit 22 and the left display unit 24 to the right light-guiding plate 26 and the left light-guiding plate 28, respectively, to allow the user to view, by the image light, an image (Augmented Reality (AR) image) along with scenery in an outside world viewed through the image display unit 20 (this is also referred to as "display an image"). In a case where the outside light traveling from the front of the user passes through the right light-guiding plate 26 and the left light-guiding plate 28 and enters the eyes of the user, the image light forming an image and the outside light enter the eyes of the user. The visibility of images viewed by the user can be affected by the intensity of the outside light.

The visibility of images may thus be adjusted, for example, by mounting dimmer plates on the front frame 27 and by appropriately selecting or adjusting the optical properties of the dimmer plates. In a typical example, dimmer plates may be selected to have a light transmittance to allow the user with the HMD 100 to view at least an external scene. The visibility of images may also be improved by suppressing sunlight. The use of the dimmer plates is also expected to be effective in protecting the right light-guiding plate 26 and the left light-guiding plate 28 to prevent, for example, damage and adhesion of dust to the right light-guiding plate 26 and the left light-guiding plate 28. The dimmer plates may be removably attached to the front frame 27 or each of the right light-guiding plate 26 and the left light-guiding plate 28. Alternatively, different types of removable dimmer plates may be provided for replacement, or alternatively the dimmer plates may be omitted.

A camera 61 is arranged on the front frame 27 of the image display unit 20. The camera 61 is provided on a front surface of the front frame 27 and positioned so that the camera 61 does not block the outside light passing through the right light-guiding plate 26 and the left light-guiding plate 28. In the example in FIG. 1, the camera 61 is arranged on the end ER of the front frame 27. The camera 61 may be arranged on the end EL of the front frame 27 or at the connection between the right light-guiding plate 26 and the left light-guiding plate 28.

The camera 61 is a digital camera including an imaging lens, and an imaging element such as a charge-coupled device (CCD) and a complementary metal oxide semiconductor (CMOS). The camera 61 according to the exemplary embodiment is a monocular camera. However, a stereo camera may be adopted. The camera 61 is configured to capture an image of at least part of an external scene (real space) in a front direction of the HMD 100, in other words, in a direction of the field of view of the user when the user wears the image display unit 20. In other words, the camera 61 is configured to capture an image in a range overlapping with the field of view of the user or an image in the direction of the field of view of the user, i.e., an image in a direction of a scene viewed by the user. An angle of view of the camera 61 can be appropriately set. In the exemplary embodiment, the angle of view of the camera 61 is set to allow the camera 61 to capture the entire field of view that is visible to the user through the right light-guiding plate 26 and the left light-guiding plate 28. The camera 61 is controlled by a control function unit 150 (FIG. 6) to capture an image and output the data of the captured image to the control function unit 150.

The HMD 100 may include a distance measurement sensor configured to detect the distance to a measured object located along a predetermined measurement direction. The distance measurement sensor may be arranged at the connection between the right light-guiding plate 26 and the left light-guiding plate 28 of the front frame 27, for example. The measurement direction of the distance measurement sensor may be the front direction of the HMD 100 (a direction overlapping with an imaging direction of the camera 61). The distance measurement sensor may include, for example, a light emitting part, such as a LED or a laser diode, configured to emit light, and a light receiving part configured to receive light reflected by the object to be measured. In this case, a distance is determined by a triangulation process or a distance measurement process based on a time difference. The distance measurement sensor may include, for example, a transmission part configured to transmit ultrasonic waves and a reception part configured to receive the ultrasonic waves reflected by an object to be measured. In this case, a distance is determined by the distance measurement process based on the time difference. Like the camera 61, the distance measurement sensor measures a distance in accordance with an instruction from the control function unit 150 and outputs the result of detection to the control function unit 150.

Figure 2:
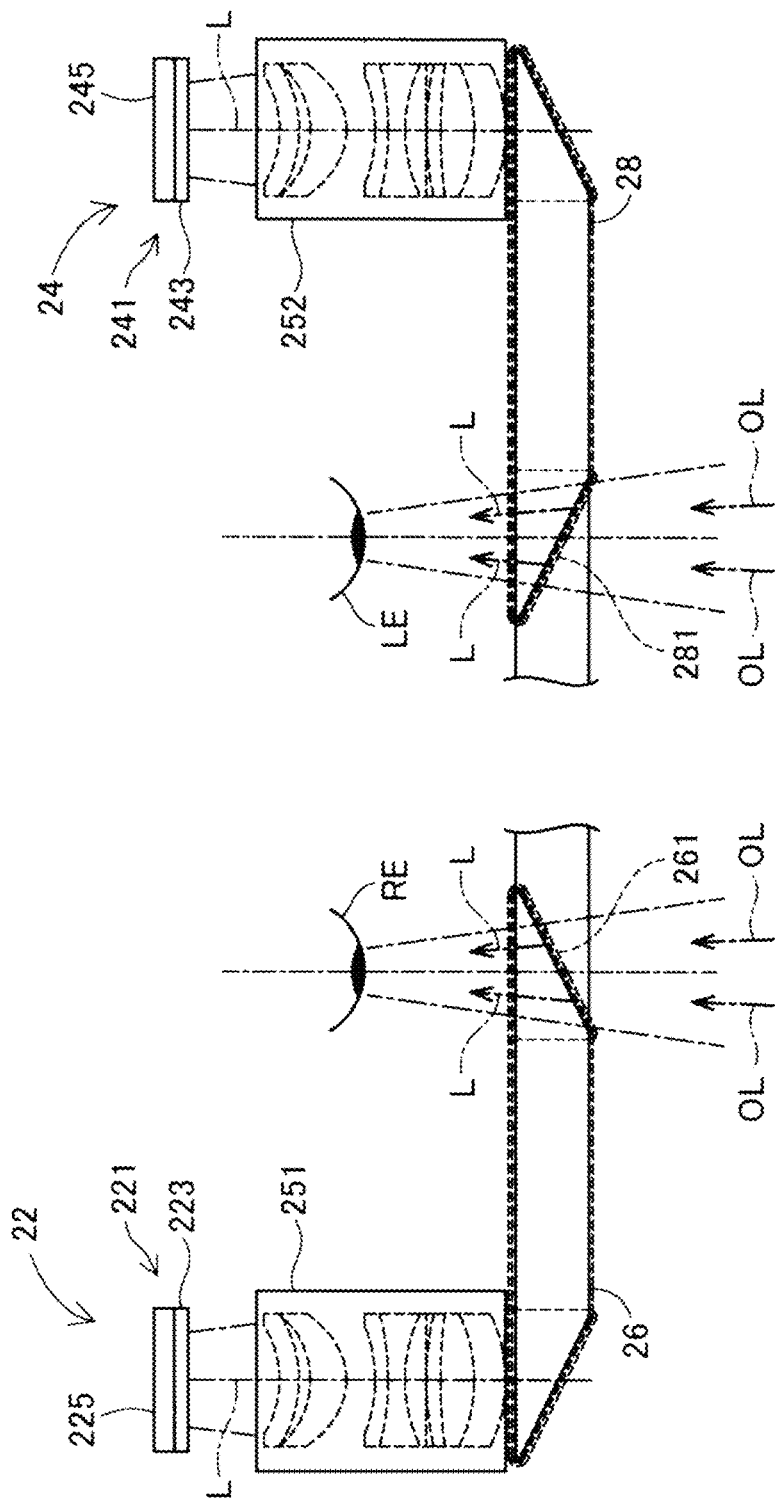
FIG. 2 is a plan view illustrating a configuration of a main part of an optical system included in an image display unit.

FIG. 2 is a plan view illustrating a configuration of a main part of an optical system included in the image display unit 20. For convenience of description, FIG. 2 illustrates the right eye RE and left eye LE of the user. As illustrated in FIG. 2, the right display unit 22 and the left display unit 24 are arranged symmetrically on the right-hand and left-hand sides.

To allow the right eye RE to view an image (AR image), the right display unit 22 includes an organic light emitting diode (OLED) unit 221 and a right optical system 251. The OLED unit 221 is configured to emit imaging light. The right optical unit 251 includes a lens group and the like and is configured to guide, to the right light-guiding plate 26, imaging light L emitted by the OLED unit 221.

The OLED unit 221 includes an OLED panel 223 and an OLED drive circuit 225 configured to drive the OLED panel 223. The OLED panel 223 is a light emission type display panel including light-emitting elements configured to emit red (R) color light, green (G) color light, and blue (B) color light, respectively, by organic electro-luminescence. The OLED panel 223 includes a plurality of pixels arranged in a matrix, each of the plurality of pixels including one element of R, one element of G, and one element of B.

The OLED drive circuit 225 is controlled by the control function unit 150 (FIG. 6), which will be described later, to select and power the light-emitting elements included in the OLED panel 223 to cause the light-emitting elements to emit light. The OLED drive circuit 225 is secured by bonding or the like, for example, onto a rear face of the OLED panel 223, i.e., back of a light-emitting surface. The OLED drive circuit 225 may include, for example, a semiconductor device configured to drive the OLED panel 223, and may be mounted onto a substrate secured to the rear face of the OLED panel 223. A temperature sensor 217 (FIG. 5) described below is mounted on the substrate. The OLED panel 223 may be configured to include light-emitting elements, arranged in a matrix, that emit white color light, and color filters, disposed over the light-emitting elements, that correspond to the R color, the G color, and the B color, respectively. The OLED panel 223 may have a WRGB configuration including light-emitting elements configured to emit white (W) color light, in addition to light-emitting elements configured to emit R color light, G color light, and B color light, respectively.

The right optical system 251 includes a collimate lens configured to collimate the imaging light L emitted from the OLED panel 223. The image light L collimated by the collimate lens enters the right light-guiding plate 26. A plurality of reflective faces configured to reflect the imaging light L are formed in an optical path configured to guide light in the right light-guiding plate 26. The image light L reflected multiple times inside the right light-guiding plate 26 is guided to the right eye RE. A half mirror 261 (reflective face) in front of the right eye RE is formed on the right light-guiding plate 26. The image light L reflected by the half mirror 261 is emitted from the right light-guiding plate 26 to the right eye RE. The image light L forms an image on the retina of the right eye RE to allow the user to view the image.

To allow the left eye LE to view an image (AR image), the left display unit 24 includes an OLED unit 241 and a left optical system 252. The OLED unit 241 is configured to emit imaging light. The left optical system 252 includes a lens group and the like, and is configured to guide, to the left light-guiding plate 28, imaging light L emitted by the OLED unit 241. The OLED unit 241 includes an OLED panel 243 and an OLED drive circuit 245 configured to drive the OLED panel 243. For further details, the OLED unit 241, the OLED panel 243, and the OLED drive circuit 245 are the same as the OLED unit 221, the OLED panel 223, and the OLED drive circuit 225, respectively. A temperature sensor 239 (FIG. 5) is mounted on a substrate secured to a rear face of the OLED panel 243. For further details, the left optical system 252 is the same as the right optical system 251 described above.

According to the configuration described above, the HMD 100 may serve as a see-through display device. That is, the imaging light L reflected by the half mirror 261 and the outside light OL passing through the right light-guiding plate 26 enter the right eye RE of the user. The imaging light L reflected by the half mirror 281 and the outside light OL passing through the left light-guiding plate 28 enter the left eye LE of the user. In this manner, the HMD 100 allows the imaging light L of the internally processed image and the outside light OL to enter the eyes of the user in an overlapped manner. As a result, the user views an external scene (real world) through the right light-guiding plate 26 and the left light-guiding plate 28 and also views a virtual image (virtual image or AR image) formed by the imaging light L overlapping with the external scene.

The right optical system 251 and the right light-guiding plate 26 are also collectively referred to as a "right light-guiding unit" and the left optical system 252 and the left light-guiding plate 28 are also collectively referred to as a "left light-guiding unit". Configurations of the right light-guiding unit and the left light-guiding unit are not limited to the example described above, and any desired configuration may be adopted as long as imaging light forms an image in front of the eyes of the user. For example, diffraction gratings or translucent reflective films may be used for the right light-guiding unit and the left light-guiding unit.

In FIG. 1, the control device 10 and the image display unit 20 are connected together via a connection cable 40. The connection cable 40 is removably connected to a connector provided in a lower portion of the control device 10 and connects to various circuits inside the image display unit 20 through a tip of the left holding part 23. The connection cable 40 includes a metal cable or an optical fiber cable through which digital data is transmitted. The connection cable 40 may further include a metal cable through which analog data is transmitted. A connector 46 is provided in the middle of the connection cable 40.

The connector 46 is a jack to which a stereo mini-plug is connected, and is connected to the control device 10, for example, via a line through which analog voice signals are transmitted. In the example of the exemplary embodiment illustrated in FIG. 1, the connector 46 connects to a right earphone 32 and a left earphone 34 constituting a stereo headphone and to a headset 30 including a microphone 63.

Figure 5:
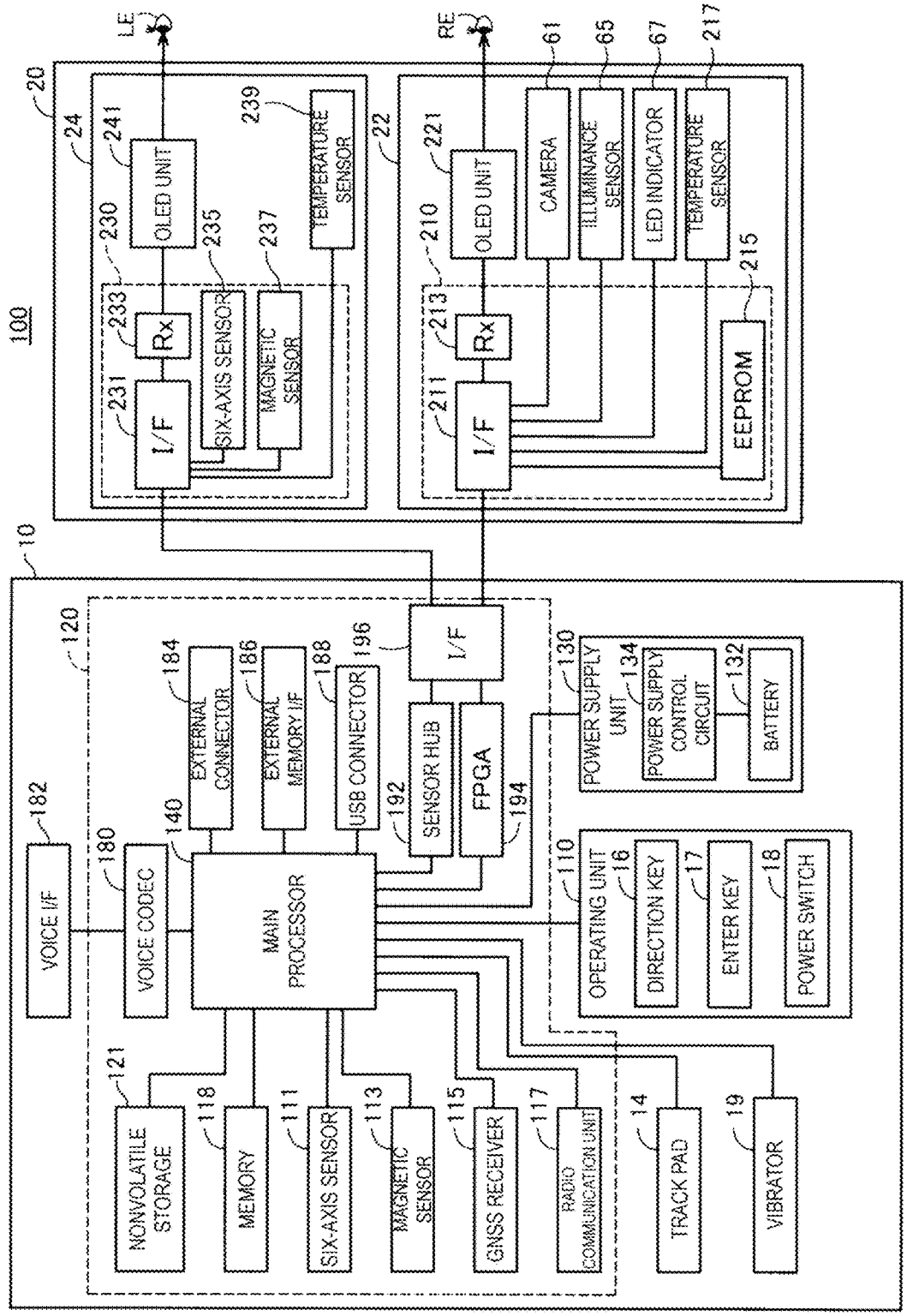
FIG. 5 is a functional block diagram illustrating a configuration of an HMD.

As illustrated in FIG. 1, for example, the microphone 63 is arranged such that a sound collector of the microphone 63 faces in a sight direction of the user. The microphone 63 is configured to collect voice and output voice signals to a voice interface 182 (FIG. 5). The microphone 63 may be a monaural microphone or a stereo microphone or it may be a directional microphone or a non-directional microphone.

The control device 10 is used to control the HMD 100. The control device 10 includes an illumination part 12, a track pad 14, a direction key 16, an enter key 17, and a power switch 18. The illumination part 12 is configured to inform the user of an operation state of the HMD 100 (e.g., power ON/OFF) with its light-emitting mode. The illumination part 12 may be, for example, light-emitting diodes (LEDs).

The track pad 14 is configured to detect a touch operation on an operation face of the track pad 14 to output a signal corresponding to what is detected. Any of various track pads, such as an electrostatic-type track pad, a pressure detection-type track pad, and an optical track pad may be adopted as the track pad 14. The direction key 16 is configured to detect a push operation onto any of keys corresponding to up, down, right, and left directions to output a signal corresponding to what is detected. The enter key 17 is configured to detect a push operation to output a signal used to determine the operation performed on the control device 10. The power switch 18 is configured to detect a switch sliding operation to switch the state of the power supply for the HMD 100.

Figure 3:
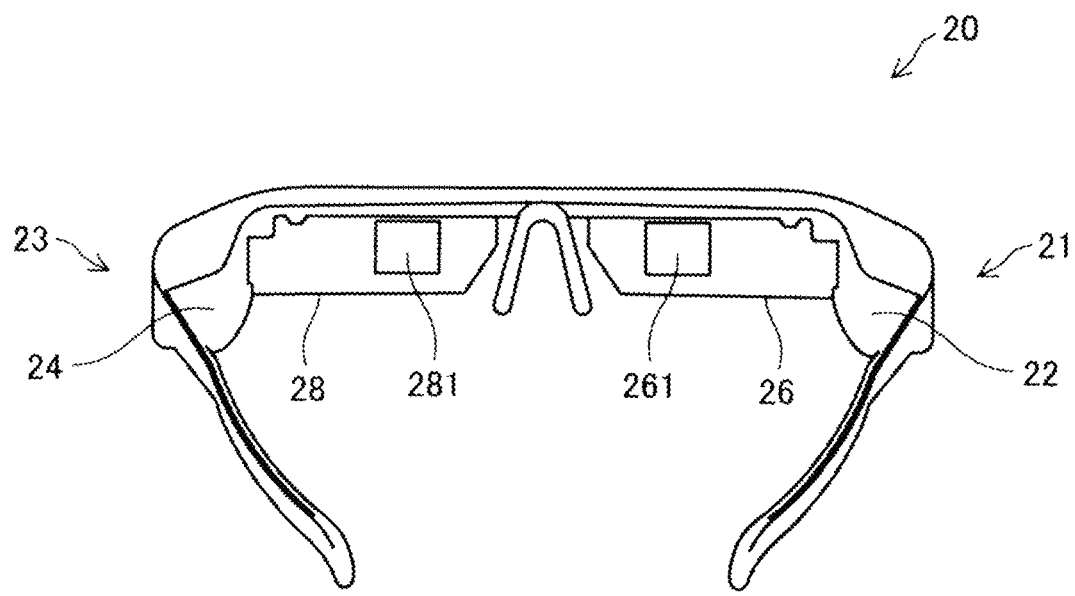
FIG. 3 is a diagram illustrating a configuration of a main part of the image display unit as viewed from a user.

FIG. 3 is a diagram illustrating a configuration of a main part of the image display unit 20 as viewed from the user. In FIG. 3, illustration of the connection cable 40, the right earphone 32, and the left earphone 34 is omitted. In the state illustrated in FIG. 3, back sides of the right light-guiding plate 26 and the left light-guiding plate 28 are visible. The half mirror 261 configured to irradiate imaging light to the right eye RE, and the half mirror 281 configured to irradiate imaging light to the left eye LE are also visible as approximately square-shaped regions. The user views an external scene through the entire areas of the right light-guiding plate 26 and the left light-guiding plate 28 including the half mirrors 261 and 281, and also views rectangular displayed images at the positions of the half mirrors 261 and 281.

Figure 4:
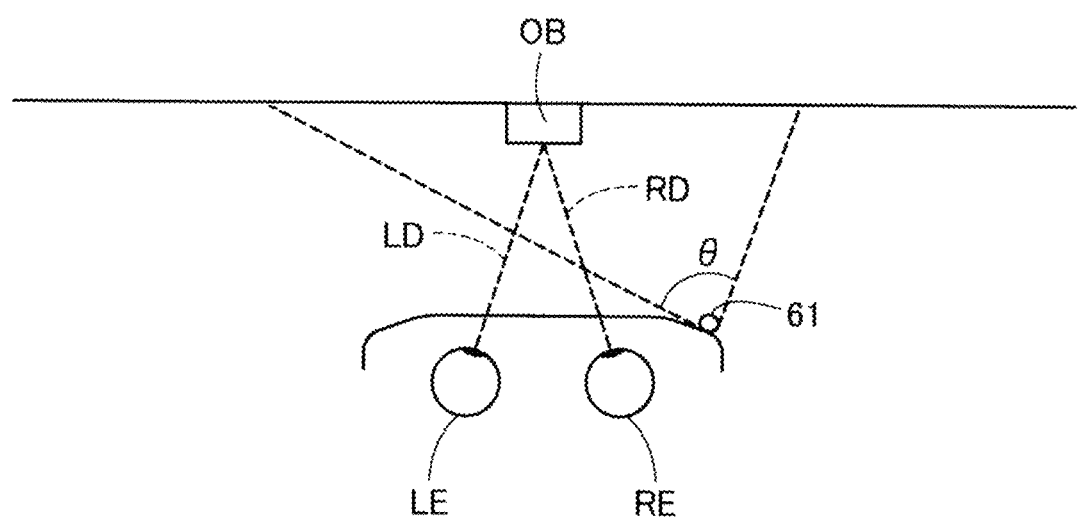
FIG. 4 is a diagram illustrating an angle of view of a camera.

FIG. 4 is a diagram for illustrating the angle of view of the camera 61. FIG. 4 schematically illustrates the camera 61, along with the right eye RE and left eye LE of the user, in a plan view. The angle of view (imaging range) of the camera 61 is represented by $\theta$. The angle of view $\theta$ of the camera 61 extends not only in a horizontal direction as illustrated in the figure, but also in a perpendicular direction as is the case with any common digital camera.

As described above, the camera 61 is arranged at an end of on the right-hand side of the image display unit 20 to capture an image in the sight direction of the user (i.e., in front of the user). For this purpose, the optical axis of the camera 61 extends in a direction including sight directions of the right eye RE and the left eye LE. The external scene that is visible when the user wears the HMD 100 is not necessarily an infinitely distant scene. For example, in a case where the user fixates on an object OB with both eyes, the line-of-sight of the user is directed to the object OB as illustrated by reference signs RD and LD in the figure. In this case, the distance from the user to the object OB is often from approximately 30 cm to 10 m, both inclusive, and is more often from 1 m to 4 m, both inclusive. Thus, standard maximum and minimum distances from the user to the object OB that the user can take during normal use of HMD 100 may be specified. These standards may be predetermined and preset in the HMD 100 or they may be set by the user. The optical axis and the angle of view of the camera 61 are preferably set such that the object OB is included within the angle of view in a case where the distance to the object OB during normal use corresponds to the set standards of the maximum and minimum distances.

In general, the viewing angle of a human is known to be approximately 200 degrees in the horizontal direction and approximately 125 degrees in the vertical direction. Within these angles, an effective visual field advantageous for information acceptance performance is approximately 30 degrees in the horizontal direction and approximately 20 degrees in the vertical direction. In general, a stable field of fixation in which a human can promptly and stably view any point of fixation is from approximately 60 degrees to 90 degrees, both inclusive, in the horizontal direction and from approximately 45 degrees to 70 degrees, both inclusive, in the vertical direction. In this case, in a case where the point of fixation lies at the object OB (FIG. 4), the effective visual field is approximately 30 degrees in the horizontal direction and approximately 20 degrees in the vertical direction around the line-of-sights RD and LD. Furthermore, the stable visual field of fixation is from approximately 60 degrees to 90 degrees, both inclusive, in the horizontal direction and from approximately 45 degrees to 70 degrees, both inclusive, in the vertical direction. The visual field of the user actually viewing an object through the image display unit 20, the right light-guiding plate 26, and the left light-guiding plate 28 is referred to as an actual field of view (FOV). The actual field of view is narrower than the visual field angle and the stable field of fixation, but is wider than the effective visual field.

The angle of view $\theta$ of the camera 61 according to the exemplary embodiment is set to capture a range wider than the visual field of the user. The angle of view $\theta$ of the camera 61 is preferably set to capture a range wider than at least the effective visual field of the user and is more preferably set to capture a range wider than the actual field of view. The angle of view $\theta$ of the camera 61 is much more preferably set to capture a range wider than the stable field of fixation of the user and is most preferably set to capture a range wider than the visual field angle of the eyes of the user. The camera 61 may thus include a wide angle lens as an imaging lens, and may be configured to capture an image with a wider angle of view. The wide angle lens may include a super-wide angle lens or a semi-wide angle lens. The camera 61 may also include a fixed focal lens, a zoom lens, or a lens group including a plurality of lenses.

FIG. 5 is a functional block diagram illustrating a configuration of the HMD 100. The control device 10 includes a main processor 140 configured to execute a program to control the HMD 100, storages, input and output units, sensors, interfaces, and a power supply unit 130. The main processor 140 connects to the storages, the input/output units, the sensors, the interfaces, and the power supply unit 130. The main processor 140 is mounted on a controller substrate 120 built into the control device 10.

The storages include a memory 118 and a nonvolatile storage 121. The memory 118 constitutes a work area in which computer programs and data to be processed by the main processor 140 are temporarily stored. The nonvolatile storage 121 includes a flash memory and an embedded Multi Media Card (eMMC). The nonvolatile storage unit 121 is configured to store computer programs to be executed by the main processor 140 and various data to be processed by the main processor 140. In the exemplary embodiment, these storages are mounted on the controller substrate 120.

The input and output units include the track pad 14 and an operation unit 110. The operation unit 110 includes the direction key 16, the enter key 17, and the power switch 18, included in the control device 10. The main processor 140 is configured to control the input and output units and acquire signals output from the input and output units.

The sensors include a six-axis sensor 111, a magnetic sensor 113, and a global navigation satellite system (GNSS) receiver 115. The six-axis sensor 111 is a motion sensor (inertia sensor) including a three-axis acceleration sensor and a three-axis gyro (angular velocity) sensor. An inertial measurement unit (IMU) in which these sensors are provided as modules may be adopted as the six-axis sensor 111. The magnetic sensor 113 is, for example, a three-axis geomagnetic sensor. The GNSS receiver 115 is configured to determine a present position (longitude and latitude) of the control device 10, based on navigation signals received from an artificial satellite constituting the GNSS. The sensors (six-axis sensor 111, magnetic sensor 113, and GNSS receiver 115) output detected values to the main processor 140 in accordance with a predetermined sampling frequency. The sensors may output detected values at timings instructed by the main processor 140.

The interfaces include a wireless communication unit 117, a voice codec 180, an external connector 184, an external memory interface 186, a universal serial bus (USB) connector 188, a sensor hub 192, a field programmable gate array (FPGA) 194, and an interface 196. The components are configured to function as an interface with external devices.

The wireless communication unit 117 is configured to perform wireless communication between the HMD 100 and an external device. The wireless communication unit 117 is configured to include an antenna (not illustrated), a radio frequency (RF) circuit, a baseband circuit, a communication control circuit, and the like, or is configured as a device into which these components are integrated. The wireless communication unit 117 is configured to perform wireless communication in compliance with standards such as Bluetooth (trade name) and wireless LAN including Wi-Fi (trade name). In the present exemplary embodiment, the radio communication unit 117 performs Wi-Fi (trade name) radio communication between the HMD 100 and the mobile body 200.

The voice codec 180 is connected to the voice interface 182 and is configured to encode and decode voice signals input and output via the voice interface 182. The voice interface 182 is an interface configured to input and output the voice signals. The voice codec 180 may include an analog/digital (A/D) converter configured to convert an analog voice signal into digital voice data and a digital/analog (D/A) converter configured to convert digital voice data into an analog voice signal. The HMD 100 according to the exemplary embodiment outputs voice from the right earphone 32 and the left earphone 34 and collects voice from the microphone 63. The voice codec 180 is configured to convert digital voice data output by the main processor 140 into an analog voice signal, and output the analog voice signal via the voice interface 182. The voice codec 180 is also configured to convert an analog voice signal input to the voice interface 182 into digital voice data, and output the digital voice data to the main processor 140.

The external connector 184 is a connector configured to connect the main processor 140 to an external device (e.g., personal computer, smartphone, or gaming device) configured to communicate with the main processor 140. The external device connected to the external connector 184 may serve as a source of contents, may debug a computer program to be executed by the main processor 140, and may collect an operation log of the HMD 100. The external connector 184 may take various forms. The external connector 184 may be a wired-connection interface such as a USB interface, a micro USB interface, and memory card interface, or a wireless-connection interface such as a wireless LAN interface and a Bluetooth interface.

The external memory interface 186 is an interface configured to connect a portable memory device. The external memory interfaces 186 include, for example, a memory card slot configured to accept a card recording medium for reading and writing data, and an interface circuit. The size and shape of the card recording medium, as well as standards to be used for the card recording medium, may be appropriately selected. The USB connector 188 is an interface configured to connect a memory device, a smartphone, a personal computer, or the like in compliance with the USB standard. The USB connector 188 includes, for example, a connector and an interface circuit in compliance with the USB standard. The size and shape of the USB connector 188, as well as the version of USB standard to be used for the USB connector 188, may be appropriately selected.

The HMD 100 further includes a vibrator 19. The vibrator 19 includes a motor (not illustrated), an eccentric rotor, and the like, and is configured to generate vibration under the control of the main processor 140. The HMD 100 causes the vibrator 19 to generate vibration in a predetermined vibration pattern, for example, in a case where an operation on the operation unit 110 is detected, or in a case where a power supply of the HMD 100 is turned on or off. The vibrator 19 may be provided, instead of being provided in the control device 10, in the image display unit 20, for example, in the right holding part 21 (right temple side) of the image display unit 20.

The sensor hub 192 and the FPGA 194 are connected to the image display unit 20 via the interface (I/F) 196. The sensor hub 192 is configured to acquire detected values of the sensors included in the image display unit 20 and output the detected values to the main processor 140. The FPGA 194 is configured to process data to be transmitted and received between the main processor 140 and components of the image display unit 20, and perform transmissions via the interface 196. The interface 196 is connected to the right display unit 22 and the left display unit 24 of the image display unit 20. In the example of the exemplary embodiment, the connection cable 40 is connected to the left holding part 23. Wiring, in the image display unit 20, connected to the connection cable 40 causes the right display unit 22 and the left display unit 24 to be connected to the interface 196 of the control device 10.

Figure 6:
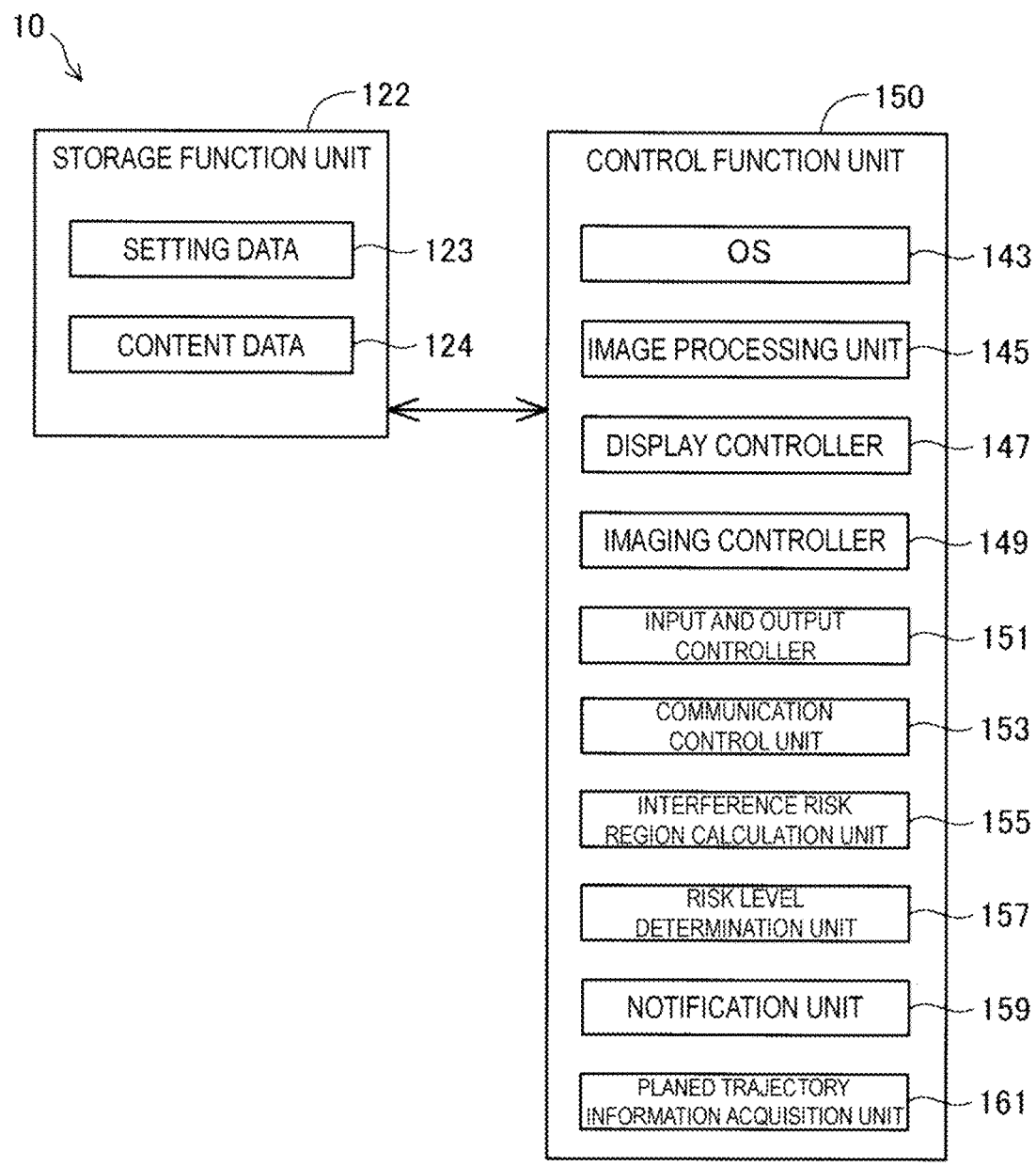
FIG. 6 is a functional block diagram illustrating a configuration of a control device.

The power supply unit 130 includes a battery 132 and a power supply control circuit 134. The power supply unit 130 is configured to supply power used to operate the control device 10. The battery 132 is a rechargeable battery. The power supply control circuit 134 is configured to detect a remaining capacity of the battery 132 and control charging of an operating system (OS) 143 (FIG. 6). The power supply control circuit 134 is connected to the main processor 140, and is configured to output the detected value of the remaining capacity of the battery 132 and the detected value of a voltage of the battery 132 to the main processor 140. Power may be supplied from the control device 10 to the image display unit 20, based on the power supplied by the power supply unit 130. The main processor 140 may be configured to control the state of power supply from the power supply unit 130 to components of the control device 10 and the image display unit 20.

The right display unit 22 includes a display unit substrate 210, an OLED unit 221, a camera 61, an illuminance sensor 65, an LED indicator 67, and a temperature sensor 217. The display unit substrate 210 is equipped with an interface (I/F) 211 connected to the interface 196, a receiving unit (Rx) 213, and an electrically erasable programmable read-only memory (EEPROM) 215. The receiving unit 213 is configured to receive data from the control device 10 via the interface 211. In a case of receiving image data of an image to be displayed on the OLED unit 221, the receiving unit 213 outputs the received image data to the OLED drive circuit 225 (FIG. 2).

The EEPROM 215 is configured to store various data in such a manner that the main processor 140 can read the data. The EEPROM 215 is configured to store, for example, data about light emission properties and display properties of the OLED units 221 and 241 of the image display unit 20, and data about sensor properties of the right display unit 22 or the left display unit 24. Specifically, for example, the EEPROM 215 is configured to store parameters regarding Gamma correction performed by the OLED units 221 and 241, and data used to compensate for the detected values of the temperature sensors 217 and 239 described below. These data are generated when the HMD 100 is inspected at the time of factory shipment, and written into the EEPROM 215. After shipment, the data is loaded from the EEPROM 215 into the main processor 140, and is used for various processes.

The camera 61 is configured to capture an image in accordance with a signal entered via the interface 211, and output imaging data or a signal indicating the result of imaging to the control device 10. As illustrated in FIG. 1, the illuminance sensor 65 is arranged on the end ER of the front frame 27 and is configured to receive outside light from the front of the user wearing the image display unit 20. The illuminance sensor 65 is configured to output a detected value corresponding to the amount of received light (intensity of received light). As illustrated in FIG. 1, the LED indicator 67 is arranged adjacent to the camera 61 on the end ER of the front frame 27. The LED indicator 67 is configured to turn on, while the camera 61 is capturing images, to notify that imaging is being performed.

The temperature sensor 217 is configured to detect a temperature to output a voltage value or a resistance value corresponding to the detected temperature. The temperature sensor 217 is mounted on the rear face of the OLED panel 223 (FIG. 2). The temperature sensor 217 and the OLED drive circuit 225 may be mounted on the same substrate, for example. This configuration allows the temperature sensor 217 to mainly detect the temperature of the OLED panel 223. The temperature sensor 217 may be built into the OLED panel 223 or the OLED drive circuit 225 (FIG. 2). For example, in a case where the OLED panel 223, together with the OLED drive circuit 225, is mounted as an Si-OLED on an integrated semiconductor chip to form an integrated circuit, the temperature sensor 217 may be mounted on the semiconductor chip.

The left display unit 24 includes a display unit substrate 230, an OLED unit 241, and a temperature sensor 239. The display unit substrate 230 is equipped with an interface (I/F) 231 connected to the interface 196, a receiving unit (Rx) 233, a 6-axis sensor 235, and a magnetic sensor 237. The receiving unit 233 is configured to receive data input from the control device 10 via the interface 231. In a case where the receiving unit 233 receives image data of an image to be displayed on the OLED unit 241, the receiving unit 233 outputs the received image data to the OLED drive circuit 245 (FIG. 2).

The six-axis sensor 235 is a motion sensor (inertial sensor) including a three-axis acceleration sensor and a three-axis gyro (angular velocity) sensor. An IMU in which the sensors described above are provided as modules may be adopted as the six-axis sensor 235. The magnetic sensor 237 is, for example, a three-axis geomagnetic sensor. The six-axis sensor 235 and the magnetic sensor 237 are provided in the image display unit 20, and thus detecting a motion of the head of the user when the image display unit 20 is mounted on the user's head. The orientation of the image display unit 20, i.e., the field of view of the user, is determined based on the detected motion of the head.

The temperature sensor 239 is configured to detect the temperature to output a voltage value or a resistance value corresponding to the detected temperature. The temperature sensor 239 is mounted on the rear face of the OLED panel 243 (FIG. 2). The temperature sensor 239 and the OLED drive circuit 245 may, for example, be mounted on the same substrate. This configuration allows the temperature sensor 239 to mainly detect the temperature of the OLED panel 243. The temperature sensor 239 may be built into the OLED panel 243 or the OLED drive circuit 245 (FIG. 2). For details, the temperature sensor 239 is similar to the temperature sensor 217.

The sensor hub 192 of the control device 10 connects to the camera 61, the illuminance sensor 65, and the temperature sensor 217 of the right display unit 22, and to the six-axis sensor 235, the magnetic sensor 237, and the temperature sensor 239 of the left display unit 24. The sensor hub 192 is configured to set and initialize a sampling period of each sensor under the control of the main processor 140. The sensor hub 192 is configured to, for example, supply power to the sensors, transmit control data, and acquire detected values in accordance with the sampling periods of the sensors. The sensor hub 192 is configured to output, at a preset timing, detected values of the sensors included in the right display unit 22 and the left display unit 24, to the main processor 140. The sensor hub 192 may be configured to include a cache function to temporarily retain the detected values of the sensors. The sensor hub 192 may be configured to include a function to convert a signal format or a data format of detected values of the sensors (e.g., function for conversion into a standard format). The sensor hub 192 is configured to start and stop supplying power to the LED indicator 67 under the control of the main processor 140 to turn on or off the LED indicator 67.

FIG. 6 is a functional block diagram illustrating a configuration of the control device 10. In terms of functions, the control device 10 includes a storage function unit 122 and a control function unit 150. The storage function unit 122 is a logical storage configured upon the nonvolatile storage 121 (FIG. 5). Instead of a configuration in which only the storage function unit 122 is used, the storage function unit 122 may be configured to use the EEPROM 215 or the memory 118, in combination with the nonvolatile storage 121. The control function unit 150 is configured upon the main processor 140 that executes a computer program, i.e., upon hardware and software that operate together.

The storage function unit 122 is configured to store various data to be processed by the control function unit 150. Specifically, the storage function unit 122 according to the present exemplary embodiment stores setting data 123 and content data 124. The setting data 123 includes various setting values for the operation of the HMD 100. For example, the setting data 123 includes a parameter, a determinant, an arithmetic expression, a Look Up Table (LUT), and the like that is used by the control function unit 150 in controlling the HMD 100.

The content data unit 124 includes data (image data, video data, voice/sound data, and the like) of contents including images and videos to be displayed by the image display unit 20 under the control of the control function unit 150. Note that the content data 124 may include data of bidirectional contents. The bidirectional content means a type of content that is displayed by the image display unit 20 in accordance with an operation of the user. The operating unit 110 acquires the operation of the user, the control function unit 150 performs a process corresponding to the acquired operation, and the image display unit 20 displays a content corresponding to the process. In this case, the data of content may include data such as image data of a menu screen used to acquire an operation of the user, and data for specifying a process corresponding to an item included in the menu screen.

The control function unit 150 is configured to use the data stored in the storage function unit 122 to execute various processes to perform the functions of the Operating System (OS) 143, an image processing unit 145, a display control unit 147, an imaging control unit 149, an input/output control unit 151, a communication control unit 153, an interference risk region calculation unit 155, a risk level determination unit 157, a notification unit 159, and a planned trajectory information acquisition unit 161. In the exemplary embodiment, the function units other than the OS 143 are configured as computer programs to be executed on the OS 143.

The image processing unit 145 is configured to generate, based on image data or video data to be displayed on the image display unit 20, signals to be transmitted to the right display unit 22 and the left display unit 24. The signals generated by the image processing unit 145 may be a vertical synchronization signal, a horizontal synchronization signal, a clock signal, an analog image signal, and the like. The image processing unit 145 may be implemented by the main processor 140 that executes a corresponding computer program, or may be configured by using hardware different from the main processor 140 (e.g., digital signal processor (DSP)).

The image processing unit 145 may be configured to execute a resolution conversion process, an image adjustment process, a 2D/3D conversion process, and the like as needed. The resolution conversion process is a process for converting the resolution of image data into a resolution appropriate for the right display unit 22 and the left display unit 24. The image adjustment process is a process for adjusting the brightness and saturation of image data. The 2D/3D conversion process is a process for generating two-dimensional image data from three-dimensional image data, or generating three-dimensional image data from two-dimensional image data. In a case where any of the processes is executed, the image processing unit 145 is configured to generate a signal for displaying an image based on the processed image data and transmits the signal to the image display unit 20 via the connection cable 40.

The display controller 147 is configured to generate control signals for controlling the right display unit 22 and the left display unit 24, and use the control signals to control the generation and emission of the image light by each of the right display unit 22 and the left display unit 24. Specifically, the display controller 147 is configured to control the OLED drive circuits 225 and 245 to cause the OLED panels 223 and 243 to display images. The display controller 147 is configured to control, for example, a timing when the OLED drive circuits 225 and 245 draw images on the OLED panels 223 and 243, and brightness of the OLED panels 223 and 243, based on the signal output by the image processing unit 145.

In an interference risk region display control process described below, the display control unit 147 controls a display mode of an image indicating an interference risk region (hereinafter referred to as "interference risk region image") among the images displayed on the image display unit 20. The interference risk region will be described in detail below. As described below, the interference risk region image is displayed in a display mode according to the risk level determined by the risk level determination unit 157. Specifically, according to the determined risk level, the display control unit 147 changes the shape, size, transparent color, on/off of blinking and the like of the displayed interference risk region image.

The imaging controller 149 is configured to control the camera 61 to capture an image and generate captured imaging data, and to cause the storage function unit 122 to temporarily store the captured imaging data. In a case where the camera 61 is configured as a camera unit including a circuit for generating imaging data, the imaging controller 149 is configured to acquire the imaging data from the camera 61 and causes the storage function unit 122 to temporarily store the imaging data. In the interference risk region display control process described below, the imaging control unit 149 acquires a captured image by repeatedly imaging the outside scenery viewed through the image display unit 20. The captured image that is acquired is used in detection of variation of the position and orientation of the HMD 100 (camera 61).

The input and output controller 151 is configured to appropriately control the track pad 14 (FIG. 1), the direction key 16, and the enter key 17 to receive input commands. The received input commands are output to the OS 143, or a computer program operating on the OS 143 along with the OS 143.

The communication control unit 153 performs radio communication with the mobile body 200 by controlling the radio communication unit 117.

The interference risk region calculation unit 155 calculates the interference risk region in the interference risk region display control process described below. In the present exemplary embodiment, the "interference risk region" means a region where there may be a risk of interference between the user and the mobile body 200 in a region in the viewing direction of the user of the HMD 100. In other words, the interference risk region includes a region where there is a risk at the present time, and a region where there may be a risk in the future. For example, the interference risk region is a region where the clothes and/or body of the user might be damaged by interference between the mobile body 200 and the user, a region where the clothes and/or body of the user may be caught into the mobile body 200 by the interference between the mobile body 200 and the user, a region where there is a risk of interference between the mobile body 200 and other mobile bodies and/or objects around the mobile body 200, or the like.

The risk level determination unit 157 determines the risk level of interference between the user of the HMD 100 and the mobile body 200 in the interference risk region display control process described below. Such a risk level is determined based on the relative positional relationship between the user and the mobile body 200, depending on the variation of the orientation and position of the HMD 100 and the planned trajectory of the mobile body 200. Note that the method of determining the risk level will be described in detail below.

The notification unit 159 causes the image display unit 20 to display a notification relating to the risk level in a case where it is determined that the risk level becomes a predetermined risk level within a predetermined time period after an interference risk region image is displayed on the image display unit 20, in the interference risk region display control process described below. Such a notification display is displayed in a display mode corresponding to the risk level determined by the risk level determination unit 157. In the present exemplary embodiment, the above-described "predetermined time period" means 30 seconds. Note that any time periods may be set instead of 30 seconds. The "predetermined risk level" will be described in detail below.

The planned trajectory information acquisition unit 161 acquires information indicating the planned trajectory of the mobile body 200 (hereinafter, referred to as "planned trajectory information") from the mobile body 200 via the radio communication unit 117. In the present exemplary embodiment, the "planned trajectory information" means the present position and orientation of the mobile body 200, sequence information relating to the movement of the mobile body 200, information indicating the planned trajectory on which the mobile body 200 moves, and the like. The "sequence information" is time-series information relating to the planned movement of the mobile body 200, for example, information indicating, in time series, a procedure of when, where, and with what movement the mobile body 200 works. Note that the planned trajectory information may include information relating to the mobile body 200 such as the size, driving performance, steering angle and the like of the mobile body 200.

In the present exemplary embodiment, the imaging control unit 149 is a specific concept of the imaging unit in SUMMARY. The radio communication unit 117 is a specific concept of the communication unit in SUMMARY.

A2. Augmented Reality Display

Figure 7:
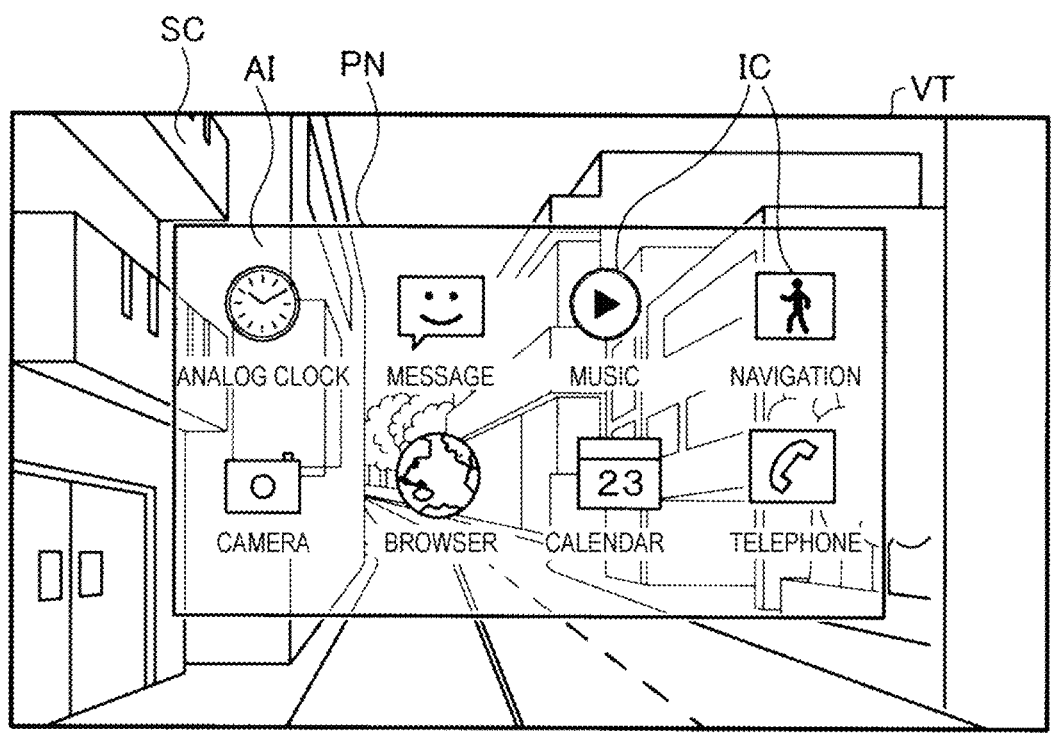
FIG. 7 is an explanatory diagram illustrating an example of an augmented reality display of the HMD.

FIG. 7 is an explanatory diagram illustrating an example of augmented reality display provided by the HMD 100. FIG. 7 illustrates the user's field of view VT. As described above, image light guided to both eyes of the user of the HMD 100 is formed into an image on the user's retina, allowing the user to view an object image AI of a display object in the display area PN as augmented reality (AR). In the example illustrated in FIG. 7, the object image AI is a menu screen of the OS of the HMD 100. The menu screen includes icon images IC for activating application programs, e.g., an "analog clock", a "message", "music", "navigation", a "camera", a "browser", a "calendar", and a "telephone". Furthermore, an external light passes through the right light-guiding plate 26 and the left light-guiding plate 28, allowing the user to view an external scene SC. Thus, in a portion of the field of view VT in which the object image AI is displayed, the object image AI is visible to the user of the HMD 100 according to the present exemplary embodiment in such a manner that the object image AI overlaps the outside scenery SC. Furthermore, in a portion of the field of view VT in which the object image AI is not displayed, only the outside scenery SC is visible to the user.

Figure 8:
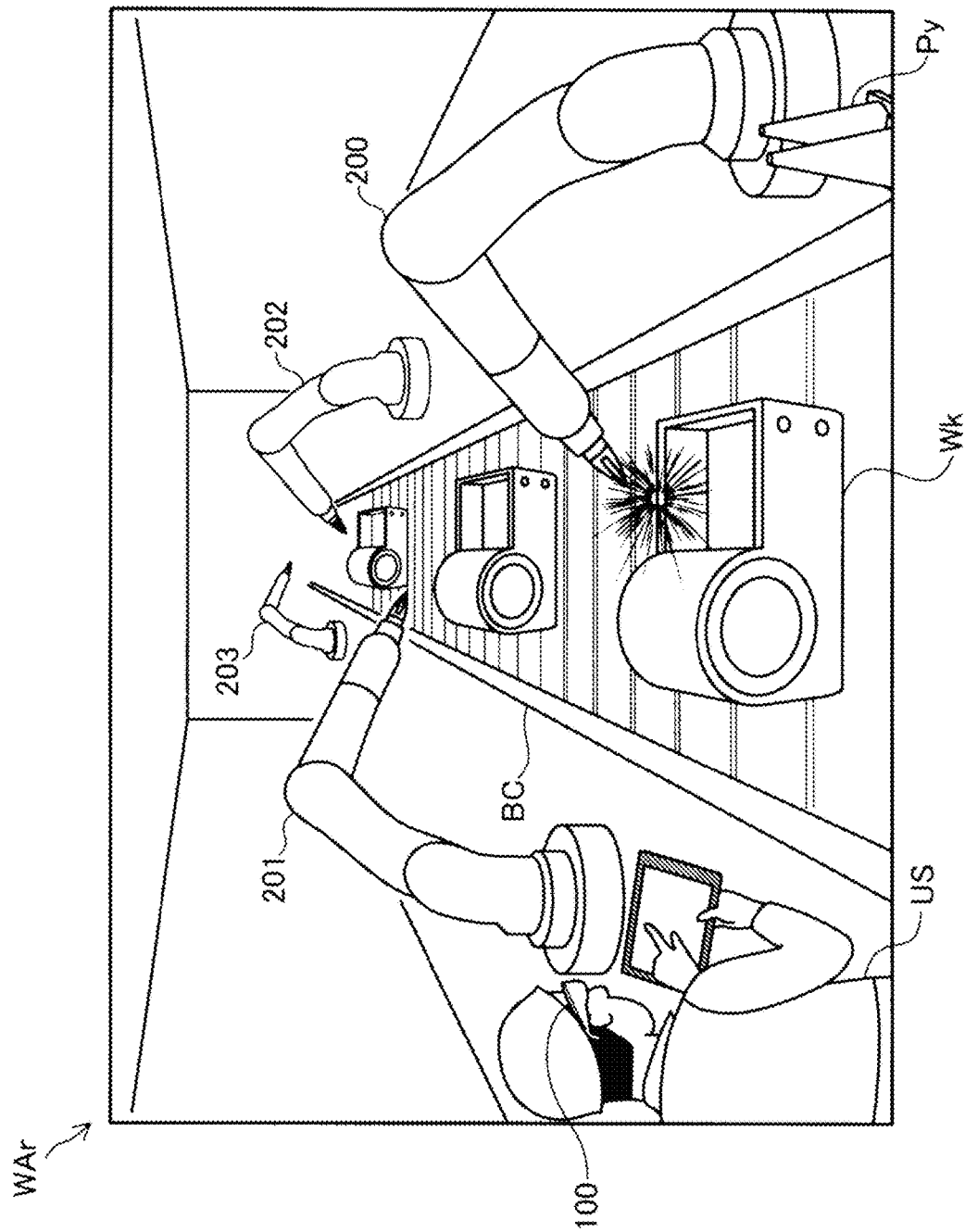
FIG. 8 is an explanatory diagram schematically illustrating a state in a working area.

FIG. 8 is an explanatory diagram schematically illustrating a state in a working area WAr. The state in the working area WAr illustrated in FIG. 8 is viewed by a user US through the image display unit 20 of the HMD 100 mounted on the user US. Accordingly, normally, the user US is not depicted in the working area WAr illustrated in FIG. 8, but in FIG. 8, the user US is depicted together with the mobile body 200 for convenience of description. The user US wearing the HMD 100 is operating the mobile body 200 while confirming the contents displayed on the image display unit 20. The mobile body 200 performs the work taught in advance by operating the arm of the mobile body 200 against a working object Wk conveyed by a conveyance device BC. Note that mobile bodies 201, 202 and 203 having configurations similar to that of the mobile body 200 are disposed in the working area WAr, and the mobile bodies 201 to 203 work as with the mobile body 200. The conveyance device BC moves from upper side to lower side in FIG. 8, and the lower side of FIG. 8 (near side) is the terminal end. The user US views the working area WAr from the terminal end side and operates the mobile body 200.

Here, as illustrated in FIG. 8, no safety fence is provided around the mobile body 200 in the working area WAr. Pylons Py used for sectioning the region are not disposed to surround the mobile body 200. In addition, the floor surface on which the mobile body 200 is disposed is not sectioned by colors or the like. Accordingly, the user US may mistakenly enter the movable region of the mobile body 200. However, calculating a region where there is a risk of interference between the user US and the mobile body 200 and displaying the calculated region in a display mode corresponding to the risk level of the interference in the interference risk region display control process described below may avoid the interference between the user US and the mobile body 200. Concrete contents of the processing are described below.

A3. Interference Risk Region Display Control Process

Figure 9:
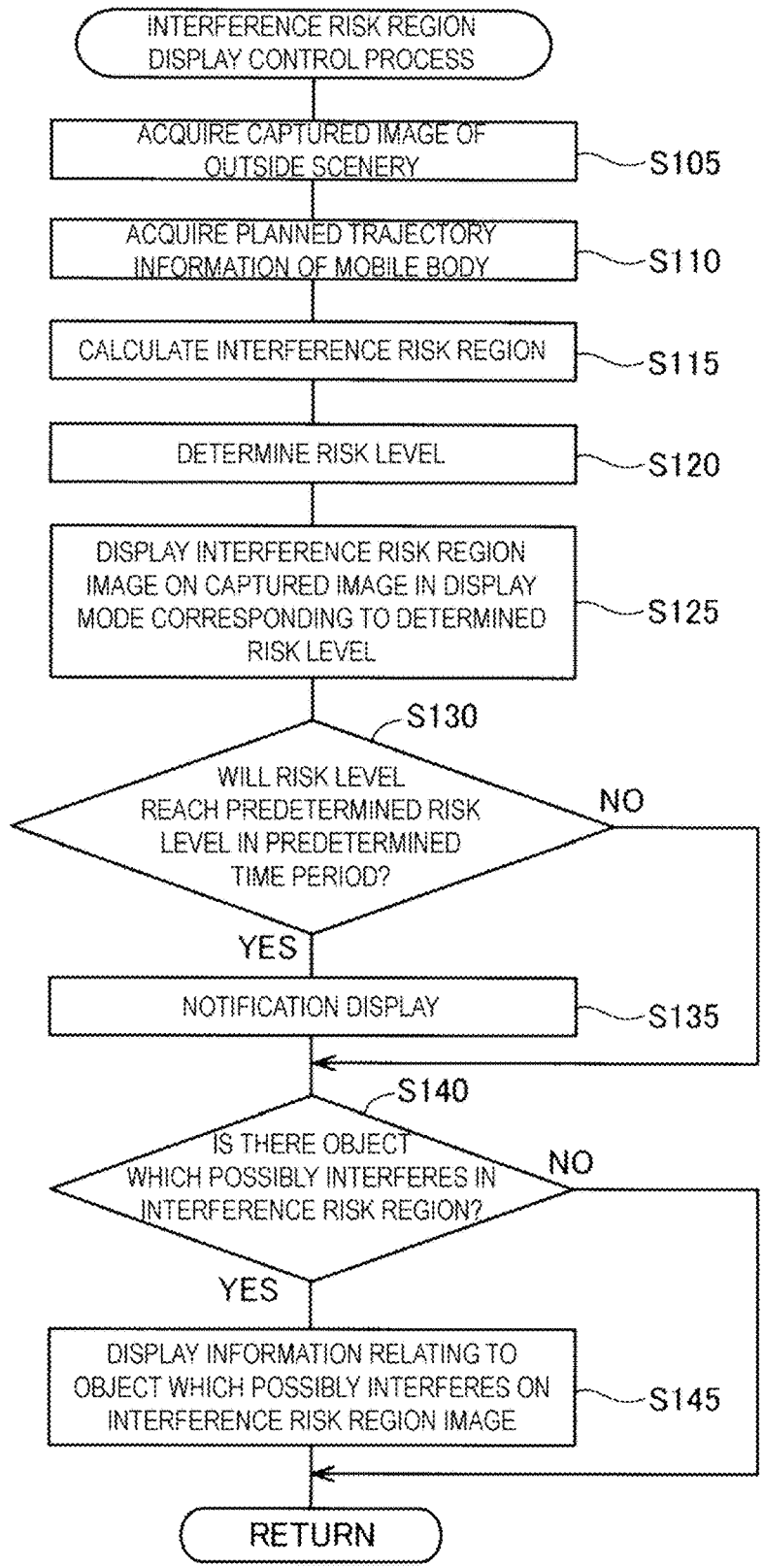
FIG. 9 is a flowchart illustrating a procedure of an interference risk region display control process.

FIG. 9 is a flowchart of a procedure of the interference risk region display control process. The interference risk region display control process starts in response to the setting to turn on the power switch 18. As illustrated in FIG. 9, the imaging control unit 149 acquires a captured image of an outside scenery (step S105).

The planned trajectory information acquisition unit 161 acquires planned trajectory information of the mobile body 200 (step S110). Specifically, the planned trajectory information acquisition unit 161 acquires the above-described planned trajectory information from the mobile body 200 through communication with the radio communication unit 117. Note that the planned trajectory information is acquired from the mobile body 200 and stored in the storage function unit 122 in advance, and the storage function unit 122 may be referred for the planned trajectory information.

The interference risk region calculation unit 155 calculates the interference risk region (step S115). Specifically, first, the interference risk region calculation unit 155 determines possible regions to which the user US may move (hereinafter referred to as "user estimation region"). Specifically, the interference risk region calculation unit 155 detects the position and orientation of the HMD 100 by using a detection result of the 6-axis sensor 111 mounted on the HMD 100. The interference risk region calculation unit 155 analyzes the acquired captured image to detect variation in line of sight of the user US, in other words, variation in position of the camera 61. Then, the interference risk region calculation unit 155 determines the user estimation region at each time by using the detection results.

Next, the interference risk region calculation unit 155 determines the regions to which the mobile body 200 plans to move and the possible regions where the arm of the mobile body 200 is to be movable (hereinafter referred to as "mobile body estimation region") at each time, by using the planned trajectory information of the mobile body 200. Thereafter, the interference risk region calculation unit 155 matches the estimation regions of each time, the estimation regions being determined in a time-series manner. For example, the interference risk region calculation unit 155 determines a region where the estimation regions completely overlap each other at a certain time, a region where the estimation regions partially overlap each other and the like to calculate, as the interference risk region, an interfering region at the present time, a region where there is a risk of interference, and a region expected to have a risk of interference in the future. Note that the interference risk region calculation unit 155 may store image recognition patterns in the storage function unit 122 in advance and match each of the image recognition patterns and the captured image to calculate the interference risk region.

The risk level determination unit 157 determines the risk level, based on the relative positional relationship between the user US and the mobile body 200 in the interference risk region (step S120). Specifically, first, the risk level determination unit 157 determines the positions of the user US and the mobile body 200 on a time-series basis by using the detection result of the 6-axis sensor 111 and the planned trajectory information, and calculates the distance between the user US and the mobile body 200 in a time-series manner from the determined positions. Next, the risk level determination unit 157 determines the risk level according to the shortest distance between the user US and the mobile body 200 in the time-series. For example, the risk level determination unit 157 determines the risk level at the time when the distance between the user US and the mobile body 200 is shortest as the highest risk level. For example, the risk level determination unit 157 determines the risk level according to the distance between the user US and the mobile body 200 by using the shortest distance as a reference. For example, the risk level determination unit 157 determines that the risk level is low in a case where the distance between the user US and the mobile body 200 is longer than the shortest distance.

The display control unit 147 displays the interference risk region image on the captured image in a display mode corresponding to the determined risk level (step S125). Specifically, in a case where the determined risk level is relatively high, the display control unit 147 sets the transparency of the interference risk region image to a higher value, and displays the interference risk region image. In a case where the determined risk level is relatively low, the display control unit 147 sets the transparency of the interference risk region image to a lower value, and displays the interference risk region image.

Figure 10:
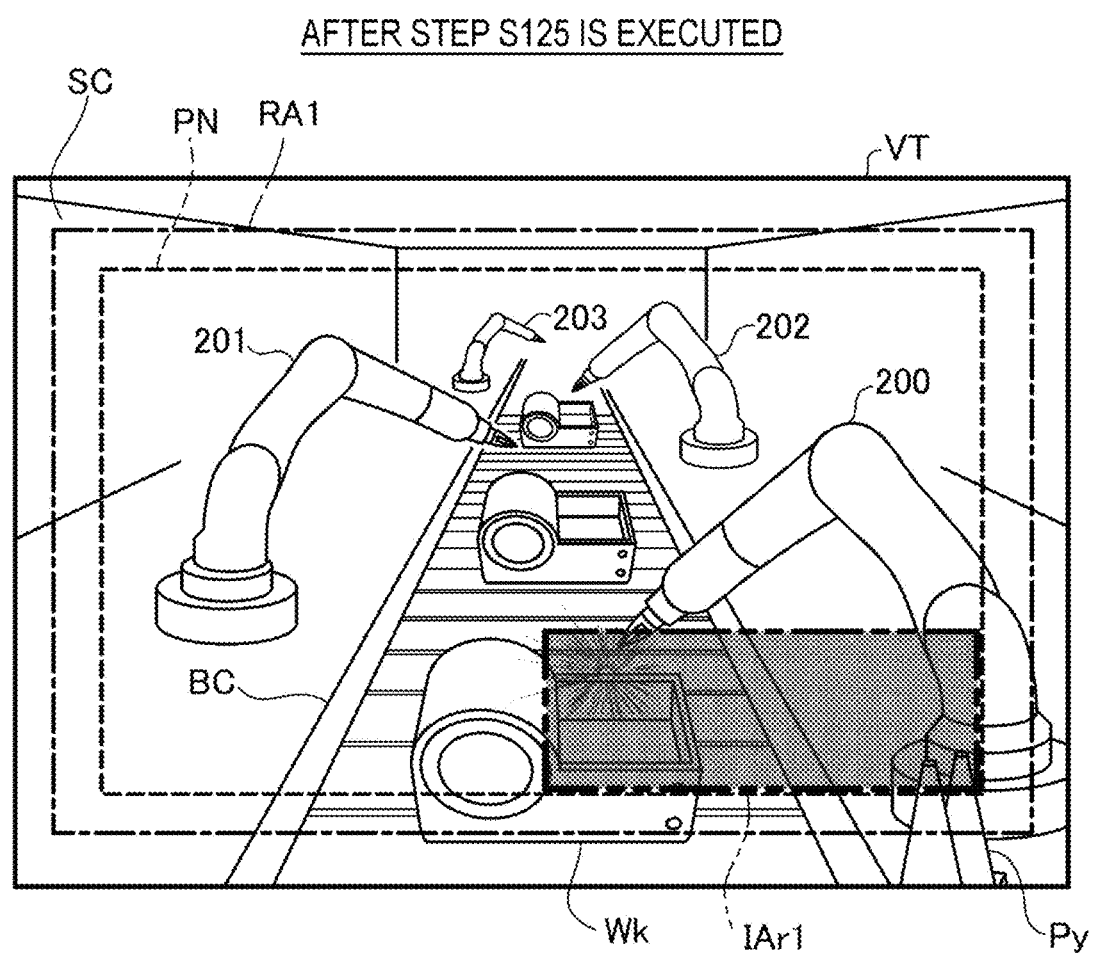
FIG. 10 is an explanatory diagram schematically illustrating an example of user's field of view after step S125 is executed.

FIG. 10 is an explanatory diagram schematically illustrating an example of the field of view VT of the user US after step S125 is executed. As illustrated in FIG. 10, in the display region PN, a part of a captured image RA1 of the outside scenery in front of the user US, in other words, the outside scenery in the direction of the line of sight of the user US is displayed. In the display region PN, an interference risk region image IAr1 is displayed on the captured image RA1. The interference risk region image IAr1 is transparently displayed. FIG. 10 illustrates an exemplary case that the risk level is relatively low. Accordingly, in comparison with the case that the risk level is high, the transparency of the interference risk region image IAr1 is set to a lower value and the interference risk region image IAr1 is displayed with less transparency. Note that, although not illustrated in the drawings, in a case where the risk level is relatively high, the transparency of the interference risk region image IAr1 is set to a relatively high value, and the interference risk region image IAr1 is displayed with more transparency than the case that the risk level is low as described above.

As illustrated in FIG. 9, after above-described step S125 is executed, the risk level determination unit 157 determines whether it is determined that the risk level becomes a predetermined risk level within a predetermined time period after step S125 is executed (step S130). In the present exemplary embodiment, the "predetermined risk level" means a level at which there is an estimated risk of the interference between the user US and the mobile body 200. Specifically, the "predetermined risk level" means the risk level at the time when the distance between the user US and the mobile body 200 at each time calculated at step S120 is zero, or a prescribed distance or smaller.

At step S130, the risk level determination unit 157 calculates the time at which the distance between the user US and the mobile body 200 calculated at step S120 is zero, and determines whether the calculated time is within a predetermined time. In a case where the calculated time is within the predetermined time, it is determined that the risk level becomes the predetermined risk level. On the other hand, in a case where the calculated time is not within the predetermined time, it is not determined that the risk level becomes the predetermined risk level. In a case where it is determined that the risk level becomes the predetermined risk level (step S130: YES), the notification unit 159 displays a notification relating to the risk level (step S135).

Figure 11:
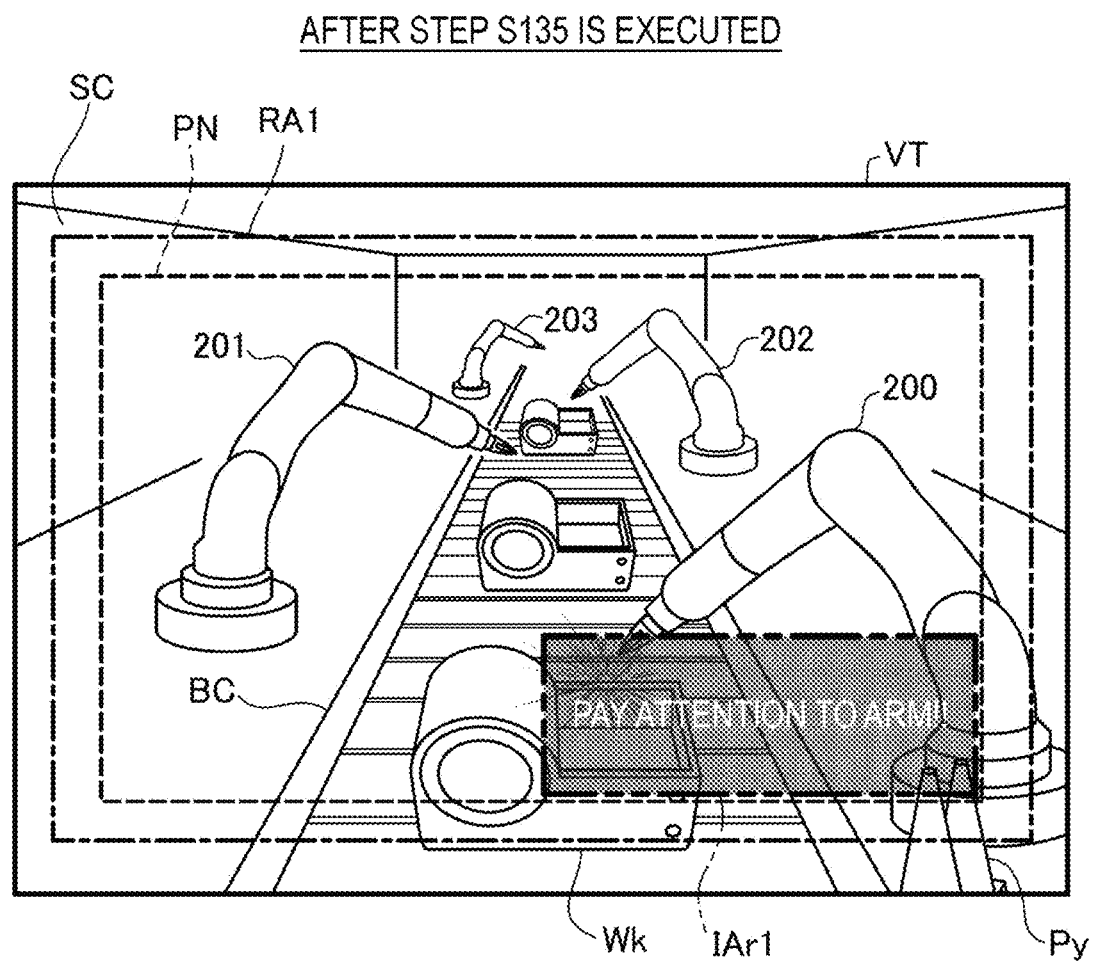
FIG. 11 is an explanatory diagram schematically illustrating an example of the user's field of view after step S135 is executed.

FIG. 11 is an explanatory diagram schematically illustrating an example of the field of view VT of the user US after step S135 is executed. As illustrated in FIG. 11, in the display region PN, a part of a captured image RA1 and an interference risk region image IAr1 are displayed as in FIG. 10. "PAY ATTENTION TO ARM!!" is displayed in the interference risk region image IAr1. Therefore, the user US can easily recognize a risk of interference between the arm of the mobile body 200 and the user US.

As illustrated in FIG. 9, after step S135 is executed, or in a case where it is not determined that the risk level becomes the predetermined risk level at above-described step S130 (step S130: NO), the risk level determination unit 157 determines whether there is an object which may interfere in the interference risk region (step S140). Specifically, it is determined whether there is an object which may interfere with the user US in the direction of the line of sight of the user US of the HMD 100, in other words, in the direction in which the user US is estimated to move, in the interference risk region. Examples of the object which may interfere include the working object Wk, the pylon Py and the like. In a case where it is determined that there is an object which may interfere (step S140: YES), the display control unit 147 displays information relating to the object which may interfere overlapping with the interference risk region image IAr1 (step S145).

Figure 12:
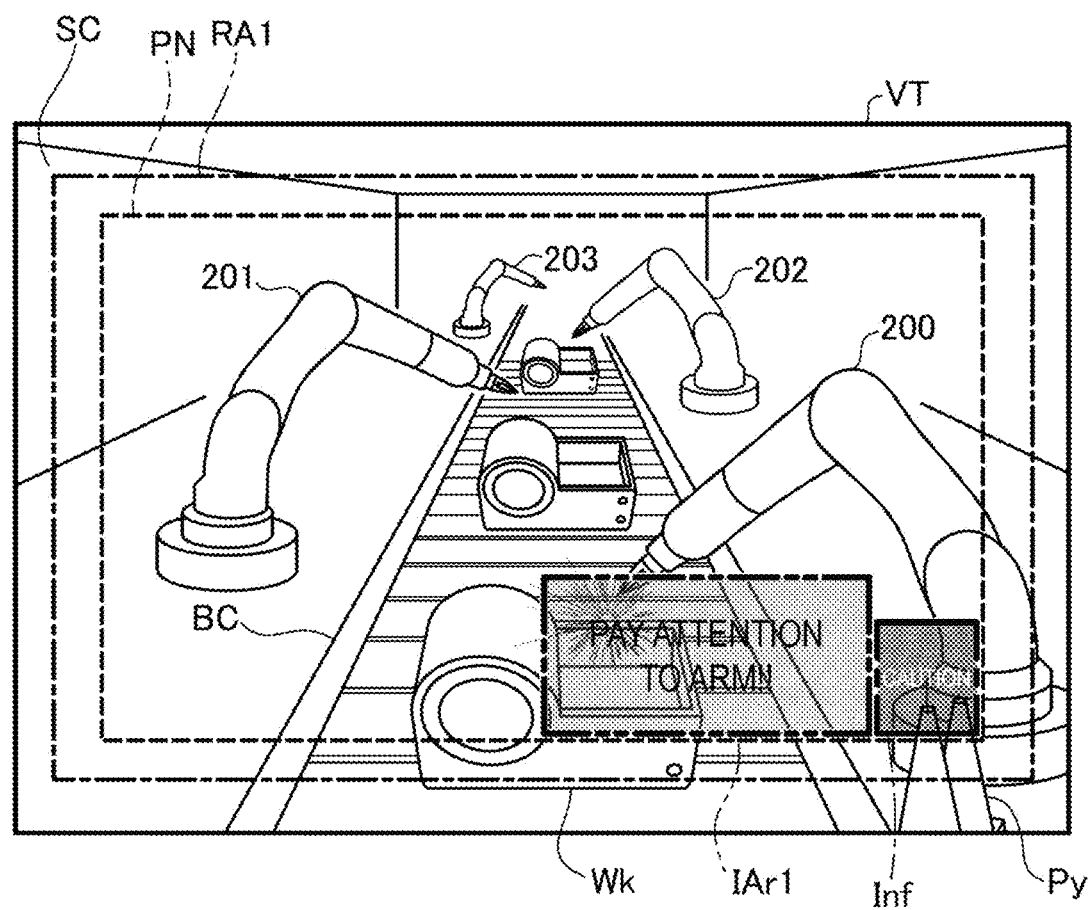
FIG. 12 is an explanatory diagram schematically illustrating an example of the user's field of view after step S145 is executed.

FIG. 12 is an explanatory diagram schematically illustrating an example of the field of view VT of the user US after step S145 is executed. As illustrated in FIG. 12, in the display region PN, a part of a captured image RA1 and an interference risk region image IAr1 are displayed as in FIG. 10 and FIG. 11. In the display region PN, information Inf relating to the object which may interfere is displayed overlapping with the pylons Py existing in the interference risk region indicated by the interference risk region image IAr1 of FIG. 10 and FIG. 11. As illustrated in FIG. 12, the information Inf indicates "CAUTION" to urge the user US to pay attention. As can be seen from comparison of FIG. 10 and FIG. 11 with FIG. 12, the transparency of the interference risk region image IAr1 illustrated in FIG. 12 is higher than the transparency of the interference risk region image IAr1 illustrated in FIG. 10 and FIG. 11. This is because the risk level of interference between the user US and the mobile body 200 is higher than the risk level of the interference between the user US and any of the pylons Py. In this manner, in a case where the risk level varies with time, the interference risk region image IAr1 may be displayed with the transparency according to the risk level for each time when the risk level varies.

As illustrated in FIG. 9, after step S145 is executed, or in a case where it is determined that there is no object which may interfere in the interference risk region at above-described step S140 (step S140: NO), above-described step S105 to step S145 are executed.

According to the HMD 100 in the present exemplary embodiment described above, the interference risk region where there is a risk of interference between the user US of the HMD 100 and the mobile body 200 is calculated, and the risk level of the interference is determined based on the relative positional relationship between the user US and the mobile body 200. The interference risk region image IAr1 indicating the calculated interference risk region is displayed on the image display unit 20 in a display mode corresponding to the determined risk level overlapping with the captured image RA1 of the outside scenery SC viewed through the image display unit 20. Thus, the user US can easily recognize the interference risk region and the risk level, and collision between the user US and the mobile body 200 can be reduced.

In a case where it is determined that the risk level becomes a predetermined risk level within a predetermined time period after the interference risk region image IAr1 indicating the interference risk region is displayed, a notification relating to the risk level is provided to the user US, and thus the user US can easily recognize a state with the higher risk of interference between the user US and the mobile body 200. Further, the notification is displayed on the image display unit 20 in a display mode corresponding to the determined risk level, and thus the user US can easily recognize the risk level, and the convenience of the user US can be improved.

Additionally, the information Inf relating to the pylons Py being objects which may interfere with the user US in the interference risk region is displayed, and thus the user US can easily recognize the object which may interfere with the user US other than the mobile body 200, and the convenience of the user US can be improved. The interference risk region is calculated based on the planned trajectory information of the mobile body 200, and thus the interference risk region can be accurately calculated. Further, the risk level is determined by using the detection result of the 6-axis sensor 111 mounted on the HMD 100 and the planned trajectory information of the mobile body 200, and thus the risk level can be precisely determined.

The interference risk region image IAr1 indicating the interference risk region is displayed with a predetermined transparent color, and thus it is possible to suppress a situation where the field of view of the user US is blocked by the display of the interference risk region image IAr1 indicating the interference risk region. Further, the planned trajectory information is acquired from the mobile body 200 through communication with the radio communication unit 117, the hardware resource can be reduced in comparison with a configuration in which the planned trajectory information is stored in advance in the storage function unit 122.

B. Second Exemplary Embodiment

A head mounted display device 100 according to Second Exemplary Embodiment is similar to the head mounted display device 100 according to first Exemplary Embodiment. Detailed description of the head mounted display device 100 according to Second Exemplary Embodiment is thus omitted. An interference risk region display control process according to Second Exemplary Embodiment is the same as the interference risk region display control process according to First Exemplary Embodiment in the procedure. The interference risk region display control process according to Second Exemplary Embodiment is applied to a case that a user US drives a vehicle of the user US with reference to operation contents displayed on the HMD 100. In other words, executing the interference risk region display control process according to Second Exemplary Embodiment may avoid collision between the vehicle driven by the user US of the HMD 100 (hereinafter, referred to as "host vehicle") and a vehicle driving around the host vehicle (hereinafter, referred to as "another vehicle"). Concrete contents of the processing are described below.

Note that, in Second Exemplary Embodiment, interference between the host vehicle and another vehicle may be interpreted as interference between the user US, who is the driver of the host vehicle, and another vehicle. In other words, the interference between the host vehicle and another vehicle corresponds to the interference between the user US and another vehicle. The vehicle is a mobile body which operates with variation in positions of its entirety in a movement region wider than the vehicle itself. In Second Exemplary Embodiment, each of the user US and the host vehicle is a specific concept of the user in SUMMARY. Another vehicle is a specific concept of the mobile body in SUMMARY.

As illustrated in FIG. 9, above-described step S105 and step S110 are executed to acquire a captured image of the outside scenery SC and planned trajectory information (estimation trajectory information) of another vehicle are acquired, and then the interference risk region is calculated (step S115). Specifically, the interference risk region calculation unit 155 uses map information which can be acquired from a navigation device mounted in the host vehicle, the present position of the host vehicle measured by the GNSS receiver 115, and the like, to determine a lane along which the host vehicle drives and a driving direction of the host vehicle, and thus acquire the estimation trajectory of the host vehicle. At this time, the estimation trajectory of the host vehicle may be acquired by using information such as the body size, turning performance, driving speed, steering angle of the vehicle. Thereafter, the interference risk region calculation unit 155 calculates the interference risk region by matching the estimation trajectory of the host vehicle and the acquired planned trajectory information of another vehicle.

After above-described step S115 is executed, above-described step S120 is executed to determine the risk level. Specifically, the risk level determination unit 157 determines the risk level, based on a vehicle-to-vehicle distance between the host vehicle and another vehicle, a difference between the driving speeds of the vehicles and the like. For example, the shorter the vehicle-to-vehicle distance between the host vehicle and another vehicle, and larger the difference between the driving speeds of the vehicles, the higher the risk level is determined. For example, the longer the vehicle-to-vehicle distance between the host vehicle and another vehicle, and the smaller the difference between the driving speeds of the vehicles, the lower the risk level is determined. After step S120 is executed, above-described step S125 is executed.

Figure 13:
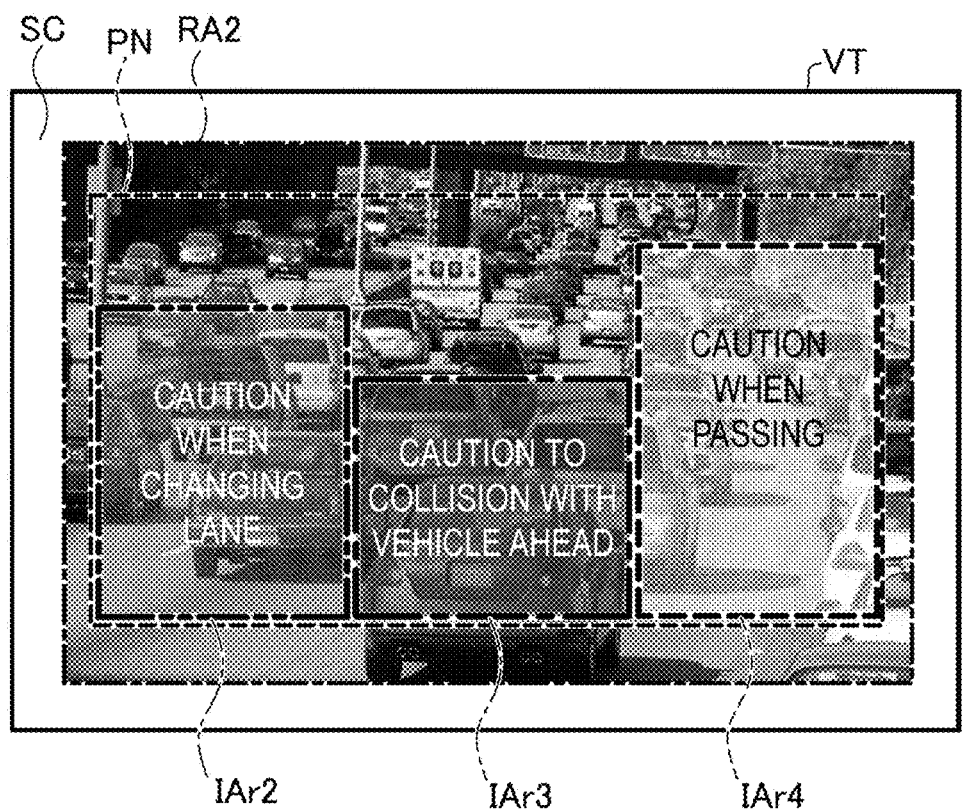
FIG. 13 is an explanatory diagram schematically illustrating an example of the user's field of view after step S125 is executed.

FIG. 13 is an explanatory diagram schematically illustrating an example of the field of view VT of the user US after step S125 is executed. In FIG. 13, for convenience of illustration, the outside scenery SC is omitted from illustration of the field of view VT of the user US. As illustrated in FIG. 13, a part of a captured image RA2 is displayed in the display region PN. In the display region PN, interference risk region images IAr2, IAr3, and IAr4 are displayed overlapping with the captured image RA2. Note that, in the example illustrated in FIG. 13, the host vehicle is driving in the same lane as a driving lane of a vehicle on which the interference risk region image IAr3 is displayed in the overlapping manner. In the example illustrated in FIG. 13, each of the risk levels of the interference risk regions are determined such that the risk level is highest in the region indicated by the interference risk region image IAr4, next highest in the region indicated by the interference risk region image IAr2, and then in the region indicated by the interference risk region image IAr3.

The interference risk region image IAr3 indicates a region where there is a risk of interference between the host vehicle and another vehicle driving ahead of the host vehicle. In the interference risk region image IAr3, a notification for urging the user US to pay attention is displayed. Specifically, a character string "CAUTION TO COLLISION WITH VEHICLE AHEAD" is displayed on the interference risk region image IAr3.

The interference risk region image IAr2 indicates a region where there is a risk of interference between the host vehicle and another vehicle driving on the left side of the host vehicle in a case where the host vehicle changes the lane. In the interference risk region image IAr2, a notification display for urging the user US to pay attention is displayed as in the interference risk region image IAr3, specifically, a character string "CAUTION WHEN CHANGING LANE" is displayed.

The interference risk region image IAr4 indicates a region where there is a risk of interference between the host vehicle and another vehicle driving on the right side of the host vehicle in a case where the host vehicle passes. In the interference risk region image IAr4, a notification for urging the user US to pay attention is displayed as in the interference risk region images IAr2 and IAr3, specifically, a character string "CAUTION WHEN PASSING" is displayed.

As illustrated in FIG. 13, the interference risk region images IAr2 to IAr4 are displayed with different sizes and different transparent colors from each other. The sizes and the transparent colors are set in advance according to the risk levels. For example, the higher the risk level, the larger the image size and the lighter the transparent color are set. Specifically, as illustrated in FIG. 13, the interference risk region image IAr4 corresponding to the highest risk level in each of the interference risk region images IAr2 to IAr4 is displayed in such a manner that the size of the image is displayed to be larger than the sizes of the interference risk region images IAr2 and IAr3. The interference risk region image IAr2 indicating the interference risk region where a risk is higher than the risk level of the interference risk region indicated by the interference risk region image IAr3 is displayed with a size larger than the size of the interference risk region image IAr3. The interference risk region image IAr4 with the highest risk level in each of the interference risk region images IAr2 to IAr4 is displayed with higher transparency than the transparency of the interference risk region images IAr2 and IAr3 and displayed lighter in comparison with the interference risk region images IAr2 and IAr3. The interference risk region image IAr2 indicating the interference risk region where a risk is higher than the risk level of the interference risk region indicated by the interference risk region image IAr3 is displayed with lower transparency comparison with the interference risk region image IAr3 and displayed lighter in comparison with the interference risk region image IAr3.

Note that each of the sizes and transparent colors of the interference risk region images IAr2 to IAr4 may not be set such that the image size increases and the transparent color becomes lighter as the risk level increases. For example, the images may be set such that the image size increases as the risk level decreases. For example, the images may be set such that the transparent color becomes lighter as the risk level decreases. With this configuration, the higher the risk level, the deeper the color of the interference risk region image displays, and thus the attention of the user US can be further attracted.

Although not illustrated in FIG. 13 for convenience of illustration, each of the interference risk region images IAr2 to IAr4 are displayed with colors corresponding to the risk levels. Specifically, in a case where there is a risk of interference between the host vehicle and another vehicle within five seconds after each of the interference risk region images IAr2 to IAr4 are displayed, the interference risk region images are displayed with red. In a case where there is a risk of interference between the host vehicle and another vehicle within 30 seconds after each of the interference risk region images IAr2 to IAr4 are displayed, the interference risk region images are displayed with yellow. In a case where there is a risk of interference between the host vehicle and another vehicle within 60 seconds after each of the interference risk region images IAr2 to IAr4 are displayed, the interference risk region images are displayed with green.

As illustrated in FIG. 9, after above-described step S125 is executed, above-described step S130 is executed to determine whether it is determined that the risk level becomes a predetermined risk level within a predetermined time period after the interference risk region images IAr2 to IAr4 are displayed. After step S130 is executed, above-described step S135 is executed.

Figure 14:
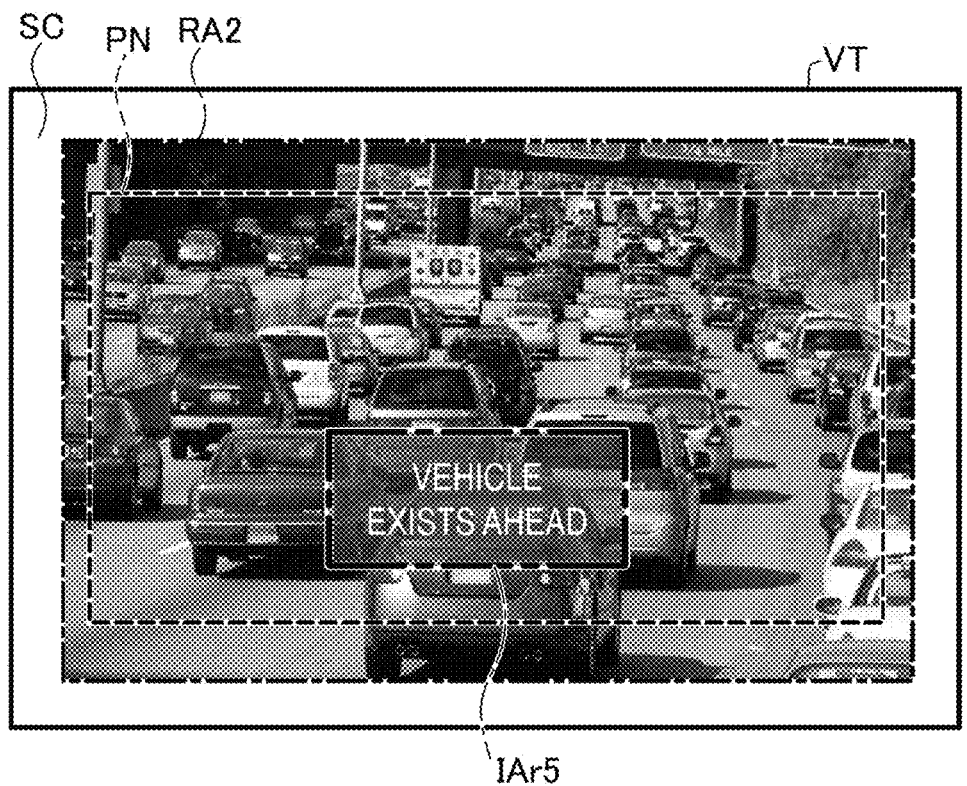
FIG. 14 is an explanatory diagram schematically illustrating an example of the user's field of view after step S135 is executed.
Figure 15:
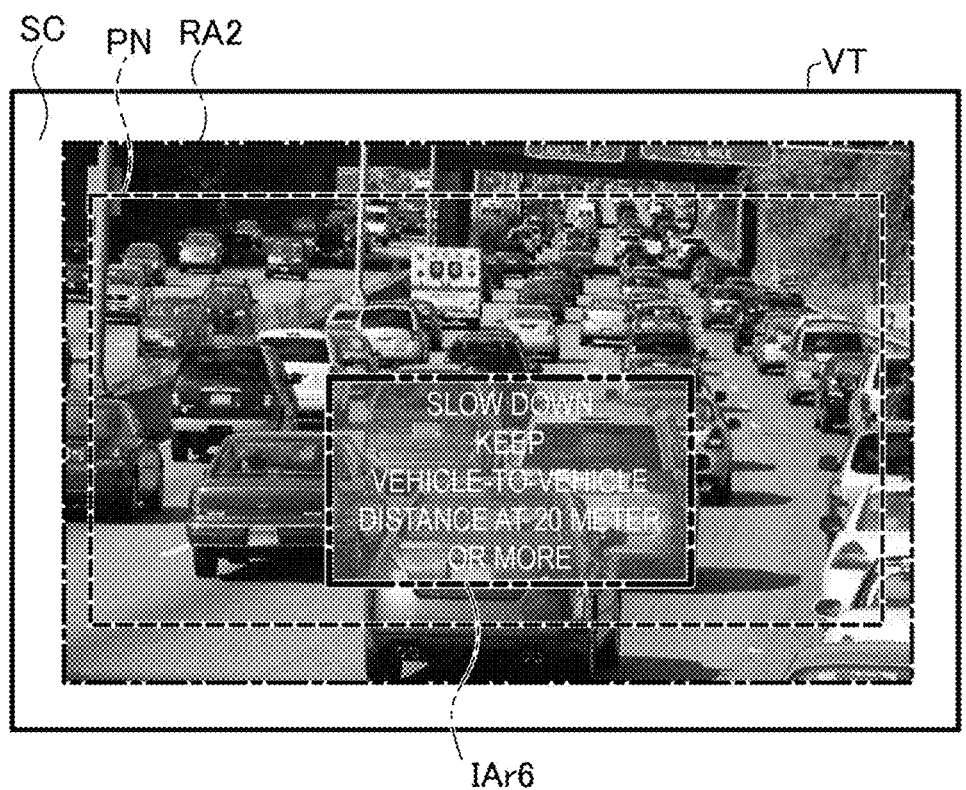
FIG. 15 is an explanatory diagram schematically illustrating an example of the user's field of view after step S135 is executed.
Figure 16:
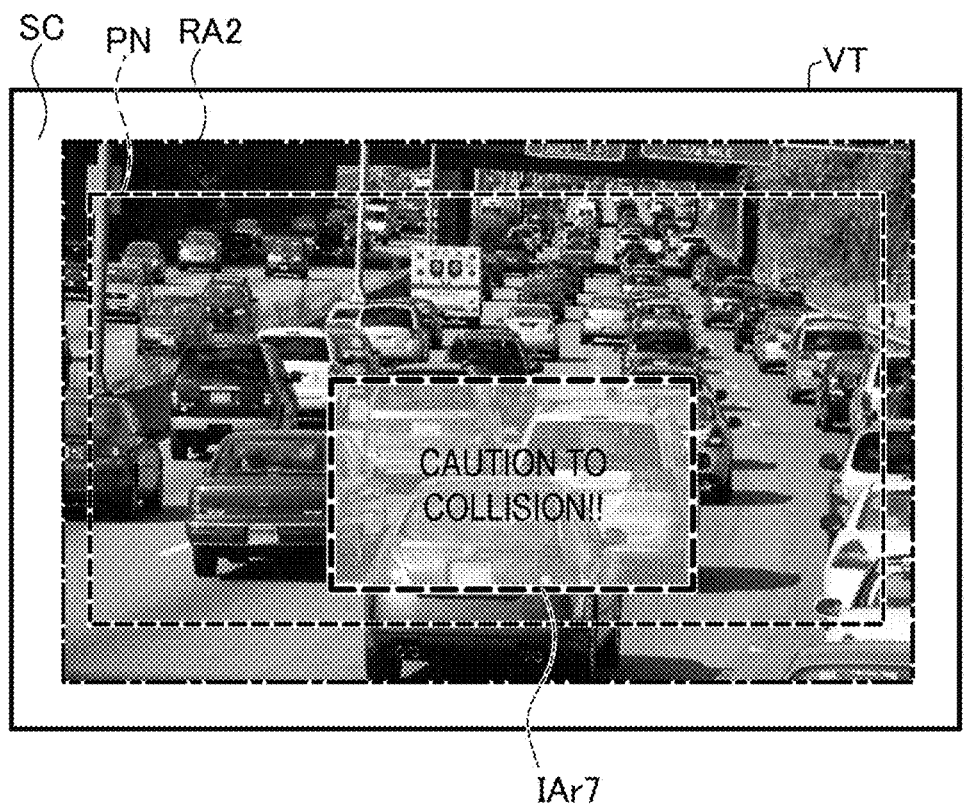
FIG. 16 is an explanatory diagram schematically illustrating an example of the user's field of view after step S135 is executed.

FIGS. 14, 15, and 16 are explanatory diagrams schematically illustrating examples of the field of view VT of the user US after step S135 is executed. FIG. 14 illustrates a case that the vehicle-to-vehicle distance between the host vehicle and the vehicle ahead is 50 meters. FIG. 15 illustrates a case that the vehicle-to-vehicle distance between the host vehicle and the vehicle ahead is 20 meters, and FIG. 16 illustrates a case that the vehicle-to-vehicle distance between the host vehicle and the vehicle ahead is 10 meters. In FIGS. 14, 15, and 16, illustration of the outside scenery SC is omitted for convenience of illustration in the drawing as in FIG. 13.

As illustrated in FIGS. 14, 15, and 16, in the display region PN, a part of a captured image RA2 is displayed, and each of interference risk region images IAr5, IAr6 and IAr7 are displayed overlapping with the captured image RA2. In each of the interference risk region images IAr5, IAr6 and IAr7, a notification which urges the user US to pay attention to vehicle ahead is displayed. Specifically, as illustrated in FIG. 14, in a case where the vehicle-to-vehicle distance between the host vehicle and the vehicle ahead is 50 meters, "VEHICLE EXISTS AHEAD" is displayed in the interference risk region image IAr5. As illustrated in FIG. 15, in a case where the vehicle-to-vehicle distance between the host vehicle and the vehicle ahead is shorter and the vehicle-to-vehicle distance between the host vehicle and the vehicle ahead is 20 meters, "SLOW DOWN" and "KEEP VEHICLE-TO-VEHICLE DISTANCE AT 20 METERS OR MORE" are displayed in the interference risk region image IAr6. As illustrated in FIG. 16, in a case where the vehicle-to-vehicle distance between the host vehicle and the vehicle ahead is further shorter and the vehicle-to-vehicle distance between the host vehicle and the vehicle ahead is 10 meters, "CAUTION OF COLLISION!!" is displayed in the interference risk region image IAr7.

Note that the driving speeds of the host vehicle and another vehicle may be changed, and thus the risk level changes in a case where at least one of the vehicles changes in the driving speed. In view of this, the risk level may be repeatedly determined to display a notification of a timely content. For example, in the example illustrated in FIG. 13, in a case where the host vehicle moves to a passing lane which is the region indicated in the interference risk region image IAr4 and the driving speed of a vehicle driving behind in the passing lane is high or increases, the notification display "CAUTION WHEN PASSING" may be changed to a notification display "NO PASSING".

To facilitate understanding by comparison of FIGS. 14, 15, and 16, the transparent colors of each of the interference risk region images IAr5 to IAr7 differ depending on the vehicle-to-vehicle distance between the host vehicle and the vehicle ahead. In other words, as the risk levels differ depending on the vehicle-to-vehicle distance between the host vehicle and the vehicle ahead, the transparent colors of each of the interference risk region images IAr5 to IAr7 differ depending on the risk level. The transparent colors are predetermined as in First Exemplary Embodiment. For example, as illustrated in FIG. 14, the transparent color is set to deep in a case where the risk level is relatively low. On the other hand, as illustrated in FIG. 16, the transparent color is set to light in a case where the risk level is relatively high. Setting the transparent color in this manner allows the captured image RA2 to be easily viewed as well as the interference risk region images IAr5 to IAr7 and the notification display to be displayed in a more noticeable manner.

As illustrated in FIG. 9, after above-described step S135 is executed, above-described step S140 is executed to determine whether there is an object which may interfere in the interference risk region. In Second Exemplary Embodiment, the examples of the object which may interfere include a human, a bicycle, a guardrail, and a material. At step S140, it is determined whether there is an object which may interfere by detecting the distance from an object present in the interference risk region by using a detection result of a sonar or the like mounted in the host vehicle in addition to information obtained by analyzing the captured image RA2. After step S140 is executed, above-described step S145 is executed.

The HMD 100 of Second Exemplary Embodiment with the above-described configuration produces an effect similar to the effect of the HMD 100 of First Exemplary Embodiment. Additionally, it may prevent collision between the user US driving the host vehicle with reference to the content displayed on the HMD 100, or the host vehicle, and another vehicle.

C. Other Exemplary Embodiments

C1. Other Exemplary Embodiment 1

While the risk level is determined based on the planned trajectory information and the detection result of the 6-axis sensor 111 in the above-described exemplary embodiments, the invention is not limited to this. For example, the risk level may be determined based on only the planned trajectory information. Alternatively, for example, the risk level may be determined based on only the detection result of the 6-axis sensor 111. Alternatively, for example, in place of the detection result of the 6-axis sensor 111, the risk level may be determined based on the analysis result of repeatedly acquired captured images. In other words, generally, effects similar to those of the above-described exemplary E=embodiments are achieved with any configurations in which the risk level is determined by using at least one of the detection result of a sensor which detects variation of the position of the HMD 100 and the planned trajectory information.

C2. Other Exemplary Embodiment 2

While the display device which executes the interference risk region display control process is the HMD 100 in the above-described exemplary embodiments, the invention is not limited to this. For example, a head-up display (HUD) or a video see-through HMD may be used. A stationary-type transmissive display device may also be used. Such a configuration also produces effects similar to the effects of the above-described exemplary embodiments.

C3. Other Exemplary Embodiment 3

While the display control unit 147 changes the transparent color and the size of the displayed interference risk region image according to the determined risk level in the above-described exemplary embodiments, the invention is not limited to this. For example, the display control unit 147 may change the shape of the displayed interference risk region image according to the risk level. Alternatively, for example, the display control unit 147 may blink the displayed interference risk region image according to the risk level. In this configuration, the displayed interference risk region image may be blinked in a case where the risk level is relatively high, and the displayed interference risk region image may not be blinked in a case where the risk level is relatively low. The duration of the blink may be varied according to the risk level in the blink display of the interference risk region image. In other words, generally, effects similar to the effects of the above-described exemplary embodiments are achieved with any configurations in which the interference risk region image is displayed in a display mode according to the determined risk level.

C4. Other Exemplary Embodiment 4

While the transparent color of the interference risk region image is set in advance in the above-described exemplary embodiments, the invention is not limited to this. For example, a user interface (setting screen) for setting the transparent color may be displayed on the image display unit 20 such that the transparent color is set by the user US operating the operating unit 110. With this configuration, the user US can set the transparent color in the HMD 100, and the convenience of the user US can be improved. The transparent color may not be set according to the risk level. Such a configuration also produces effects similar to the effects of the above-described exemplary embodiments.

C5. Other Exemplary Embodiment 5

While the interference risk region image is transparently displayed in the above-described exemplary embodiments, the invention is not limited to this. For example, the interference risk region image may not be transparent. Such a configuration also produces effects similar to the effects of the above-described exemplary embodiments.

C6. Other Exemplary Embodiment 6

While the interference risk region where there is a risk of interference between the user US and one mobile body 200 is calculated in First Exemplary Embodiment, the invention is not limited to this. For example, the interference risk region where there is a risk of interference between the user US and a plurality of mobile bodies may be calculated. Specifically, in the example illustrated in FIG. 8, the interference risk region where there is a risk of interference between the user US and the mobile bodies 200 to 203 may be calculated. Such a configuration produces effects similar to the effects of the above-described First Exemplary Embodiment.

C7. Other Exemplary Embodiment 7

While the notification unit 159 displays a notification on the image display unit 20 in the above-described exemplary embodiments, the invention is not limited to this. For example, the notification unit 159 may provide a notification with sound. For example, both the notification display on the image display unit 20 and the notification with sound may be provided. Alternatively, the notification may not be provided to the user US, for example. Such a configuration also produces effects similar to the effects of the above-described exemplary embodiments.

C8. Other Exemplary Embodiment 8

While an image indicating the planned trajectory of the mobile body 200 may be displayed overlapping with the displayed interference risk region image IAr1 in First Exemplary Embodiment. Specifically, a trajectory according to the planned trajectory of the mobile body 200 may be illustrated by an arrow. The movement speed of the mobile body 200 may be illustrated by varying the size and color of the arrow. The arrow may be enlarged or blinked in a case where it is determined that the risk level becomes a predetermined level within a predetermined time period after the interference risk region image IAr1 is displayed. Such a configuration produces effects similar to the effects of the above-described First Exemplary Embodiment.

C9. Other Exemplary Embodiment 9

While the image of an object which may interfere is displayed overlapping with the interference risk region image in First Exemplary Embodiment, the invention is not limited to this. For example, the image of the object which may interfere may not be displayed. Such a configuration produces effects similar to the effects of the above-described First Exemplary Embodiment.

C10. Other Exemplary Embodiment 10

While the planned trajectory information is acquired from the mobile body 200 in the above-described exemplary embodiments, the invention is not limited to this. For example, the planned trajectory information may be acquired from a monitoring system for the working area WAr or a monitoring system for the mobile body 200 in First Exemplary Embodiment. For example, in a case where a preceding vehicle following function is provided in the host vehicle in Second Exemplary Embodiment, the prediction trajectory of the preceding vehicle predicted by an Electronic Control Unit (ECU) may be acquired. For example, the estimated trajectory information may be acquired by using inter-vehicle communication between the host vehicle and another vehicle. Such a configuration also produces effects similar to the effects of the exemplary embodiments described above.

C11. Other Exemplary Embodiment 11

While the interference risk region images IAr1 to IAr7 are displayed overlapping with the captured image RA1 or RA2 in the above-described exemplary embodiments, the invention is not limited to this. For example, the interference risk region images IAr1 to IAr7 may not be displayed overlapping with the captured image. In such a configuration, the imaging control unit 149 may not be provided. For example, the interference risk region images IAr1 to IAr7 may be displayed according to the outside state. Specifically, the colors of the interference risk region images IAr1 to IAr7 may be set such that the interference risk region images IAr1 to IAr7 are displayed with relatively bright colors in a case where the outside is relatively dark. Alternatively, the colors of the interference risk region images IAr1 to IAr7 may be set such that the interference risk region images IAr1 to IAr7 are displayed with relatively dark colors in a case where the outside is relatively bright. In other words, the interference risk region images IAr1 to IAr7 may be displayed in association with information of the outside. Such a configuration also produces effects similar to the effects of the above-described exemplary embodiments.

C12. Other Exemplary Embodiment 12

In the exemplary embodiments described above, the OLED units 221 and 241 are configured to include the OLED panels and the OLED drive circuits 225 and 245 that respectively drive the OLED panels 223 and 243, and the OLED panels 223 and 243 are each a self-light-emitting display panel including light emitting elements that emit light by organic electro-luminescence. However, the invention is not limited to this. Furthermore, each of the OLED panels 223 and 243 includes a plurality of pixels arranged in a matrix, and each of the plurality of pixels corresponds to a unit including one element of R, one element of G, and one element of B. However, the invention is not limited to this. For example, the right display unit 22 and the left display unit 24 each may be configured as a video element that includes an OLED panel serving as a light source unit and a modulation element to modulate light emitted by the light source unit to output image light including a plurality of colors of light. Note that the modulation device for modulating the light emitted by the OLED panel is not limited to a configuration in which a transmission-type liquid crystal panel is adopted. For example, a reflective liquid crystal panel may be used instead of the transmission-type liquid crystal panel, or a digital micro-mirror device or a laser scan type laser retinal projection HMD may be used. Such a configuration also produces effects similar to the effects of the exemplary embodiments described above.

C13. Other Exemplary Embodiment 13

While the mobile body estimation region is determined based on the planned trajectory information in the above-described exemplary embodiments, the invention is not limited to this. For example, the mobile body estimation region may be determined by using the movable coordinates of the mobile body 200 which are acquired through communication with the mobile body 200. For example, in a configuration in which the mobile body 200 includes a GNSS receiver, the mobile body estimation region may be determined by using the present position (the longitude and latitude) of the mobile body 200 measured by the GNSS receiver. For example, the mobile body estimation region may be determined by using the speed of the mobile body 200 and the like. Such a configuration also produces effects similar to the effects of the exemplary embodiments described above.

The invention is not limited to the exemplary embodiments described above, but may be implemented in various configurations without departing from the spirits of the invention. For example, appropriate replacements or combinations may be made to the technical features in the exemplary embodiments which correspond to the technical features in the aspects described in the SUMMARY section to solve some or all of the problems described above or to achieve some or all of the advantageous effects described above. Any of the technical features may be deleted as appropriate unless the technical feature is described in the specification as indispensable.

The present application is based on and claims priority from JP Application Serial Number 2017-244064, filed Dec. 20, 2017, the disclosure of which is hereby incorporated by reference herein in its entirety.

What is claimed is:

1. A head-mounted transmissive display device that is worn by a user, the head-mounted transmissive display device comprising:
    an image display configured to transmit an outside scenery and display an image viewable with the outside scenery in the image display; and
    a processor programmed to:
        display, in the image display, an interference risk region in the image in accordance with a display mode, the interference risk region indicating a risk of interference between the user of the head-mounted transmissive display device and a mobile body,
        determining a position of the mobile body in a vicinity of the user,
        determine the risk level of interference between the user of the head-mounted transmissive display device and the mobile body based on the determined position of the mobile body,
        change the display mode of the interference risk region based on the determined risk level, and
        display the changed display mode in the image display, wherein:
        changing the display mode of the interference risk region includes at least one of: (a) changing a shape of the interference risk region in the image, (b) changing a size of the interference risk region in the image, (c) changing a transparent color of the interference risk region in the image, and/or (d) initiating or changing an on/off blinking of the interference risk region in the image.

2. The head-mounted transmissive display device according to claim 1 wherein the processor is further programmed to:
    provide a notification relating to the risk level to the user when the determined risk level corresponds to a predetermined risk level within a predetermined time period after the image indicating the interference risk region is displayed on the image display.

3. The head-mounted transmissive display device according to claim 2, wherein the processor is configured to display a notification on the image display in a display mode according to the determined risk level.

4. The head-mounted transmissive display device according to claim 2, wherein the processor is configured to provide the notification with sound.

5. The head-mounted transmissive display device according to claim 1, wherein the processor is configured to display information, relating to an object that has a possibility of interfering with the user in the interference risk region, on the image display.

6. The head-mounted transmissive display device according to claim 1, wherein the processor is configured to calculate the interference risk region, based on planned trajectory information indicating a planned trajectory of the mobile body.

7. The head-mounted transmissive display device according to claim 6 further comprising:
    a communication interface; wherein
    the processor is configured to acquire the planned trajectory information indicating the planned trajectory of the mobile body through communication via the communication interface.

8. The head-mounted transmissive display device according to claim 1, further comprising:

a sensor configured to detect variation of a position of the head-mounted transmissive display device, wherein
the processor is configured to determine the risk level based on at least one of a detection result of the sensor and planned trajectory information indicating a planned trajectory of the mobile body.

9. The head-mounted transmissive display device according to claim 1, wherein the processor is configured to display the image, indicating the interference risk region, with a predetermined transparent color in the image display.

10. The head-mounted transmissive display device according to claim 9, wherein the image display includes a user interface for setting the transparent color.

11. The head-mounted transmissive display device according to claim 1, further comprising:
a camera configured to obtain the image of the outside scenery, wherein
the processor is configured to cause the image, indicating the interference risk region, to be displayed overlapping with an image obtained by the camera.

12. A display control method for a head-mounted transmissive display device that is worn by a user, the head-mounted transmissive display device including an image display configured to transmit an outside scenery and display an image viewable with the outside scenery, the display control method comprising:
displaying, in the image display, an interference risk region in the image in accordance with a display mode, the interference risk region indicating a risk of interference between the user of the head-mounted transmissive display device and a mobile body,
determining a position of the mobile body in a vicinity of the user,
determining the risk level of interference between the user of the head-mounted transmissive display device and the mobile body based on the determined position of the mobile body,
changing the display mode of the interference risk region based on the determined risk level, and
displaying the changed display mode in the image display, wherein:
changing the display mode of the interference risk region includes at least one of: (a) changing a shape of the interference risk region in the image, (b) changing a size of the interference risk region in the image, (c) changing a transparent color of the interference risk region in the image, and/or (d) initiating or changing an on/off blinking of the interference risk region in the image.

13. A non-transitory computer readable medium storing a computer program for performing display control in a head-mounted transmissive display device that is worn by a user, the head-mounted transmissive display device including an image display configured to transmit an outside scenery and display an image viewable with the outside scenery, the computer program causing a computer to perform steps comprising:
displaying, in the image display, an interference risk region in the image in accordance with a display mode, the interference risk region indicating a risk of interference between the user of the head-mounted transmissive display device and a mobile body,
determining a position of the mobile body in a vicinity of the user,
determining the risk level of interference between the user of the head-mounted transmissive display device and the mobile body based on the determined position of the mobile body,
changing the display mode of the interference risk region based on the determined risk level, and
displaying the changed display mode in the image display, wherein:
changing the display mode of the interference risk region includes at least one of: (a) changing a shape of the interference risk region in the image, (b) changing a size of the interference risk region in the image, (c) changing a transparent color of the interference risk region in the image, and/or (d) initiating or changing an on/off blinking of the interference risk region in the image.

* * * * *